US012651480B2

(12) United States Patent
Ren et al.

(10) Patent No.: US 12,651,480 B2
(45) Date of Patent: Jun. 9, 2026

(54) DATA SET GENERATION AND AUGMENTATION FOR MACHINE LEARNING MODELS

(71) Applicant: NVIDIA Corporation, Santa Clara, CA (US)

(72) Inventors: Yuzhuo Ren, Sunnyvale, CA (US); Weili Nie, Sunnyvale, CA (US); Arash Vahdat, Mountain View, CA (US); Animashree Anandkumar, Pasadena, CA (US); Nishant Puri, San Francisco, CA (US); Niranjan Avadhanam, Saratoga, CA (US)

(73) Assignee: NVIDIA Corporation, Santa Clara, CA (US)

( * ) Notice: Subject to any disclaimer, the term of this patent is extended or adjusted under 35 U.S.C. 154(b) by 544 days.

(21) Appl. No.: 17/661,706

(22) Filed: May 2, 2022

(65) Prior Publication Data

US 2023/0351807 A1     Nov. 2, 2023

(51) Int. Cl.
*G06V 40/16*          (2022.01)
*G06V 10/62*          (2022.01)
(Continued)

(52) U.S. Cl.
CPC ............ *G06V 40/176* (2022.01); *G06V 10/62* (2022.01); *G06V 10/774* (2022.01); *G06V 10/82* (2022.01); *G06V 40/164* (2022.01)

(58) Field of Classification Search
CPC .... G06V 40/176; G06V 10/774; G06V 10/62; G06V 40/164; G06V 10/82
See application file for complete search history.

(56) References Cited

U.S. PATENT DOCUMENTS 11,978,266 B2 *    5/2024    Arar ..................... G06V 20/588
12,019,796 B2 *    6/2024    Zhang ................... G06V 10/25
(Continued)

FOREIGN PATENT DOCUMENTS

CN          113496290          10/2021

OTHER PUBLICATIONS

Nagarajan, Tushar, and Kristen Grauman. "Attributes as operators: factorizing unseen attribute-object compositions." Proceedings of the European Conference on Computer Vision (ECCV). 2018. (Year: 2018).*

(Continued)

*Primary Examiner* — John Villecco
*Assistant Examiner* — Alexander John Rodgers
(74) *Attorney, Agent, or Firm* — IRON SUMMIT IP LLP

(57)          ABSTRACT

A machine learning model (MLM) may be trained and evaluated. Attribute-based performance metrics may be analyzed to identify attributes for which the MLM is performing below a threshold when each are present in a sample. A generative neural network (GNN) may be used to generate samples including compositions of the attributes, and the samples may be used to augment the data used to train the MLM. This may be repeated until one or more criteria are satisfied. In various examples, a temporal sequence of data items, such as frames of a video, may be generated which may form samples of the data set. Sets of attribute values may be determined based on one or more temporal scenarios to be represented in the data set, and one or more GNNs may be used to generate the sequence to depict information corresponding to the attribute values.

20 Claims, 16 Drawing Sheets

(51) Int. Cl.
G06V 10/774 (2022.01)
G06V 10/82 (2022.01)

(56) References Cited

U.S. PATENT DOCUMENTS

| | | | |
|---|---|---|---|
| 2009/0006289 A1* | 1/2009 | Jaros | G06N 3/049 |
| | | | 706/12 |
| 2018/0181809 A1* | 6/2018 | Ranjan | G06V 10/245 |
| 2021/0192186 A1* | 6/2021 | Kim | G06V 40/165 |
| 2022/0092356 A1* | 3/2022 | Nagasamy | G06F 18/217 |
| 2022/0101047 A1 | 3/2022 | Puri et al. | |
| 2022/0138584 A1* | 5/2022 | Cintas | G06N 3/088 |
| | | | 706/20 |
| 2022/0156520 A1* | 5/2022 | Brower | G06N 20/00 |
| 2023/0004760 A1* | 1/2023 | Mustikovela | G06V 20/56 |
| 2023/0342512 A1* | 10/2023 | Balakrishnan | G06F 30/28 |

OTHER PUBLICATIONS

Karras, Tero, Samuli Laine, and Timo Aila. "A style-based generator architecture for generative adversarial networks." Proceedings of the IEEE/CVF conference on computer vision and pattern recognition. 2019. (Year: 2019).*

Du, Yilun, Shuang Li, and Igor Mordatch. "Compositional visual generation and inference with energy based models." arXiv preprint arXiv:2004.06030 (2020). (Year: 2020).*

Chen, Hui, et al. "Learning to infer unseen attribute-object compositions." arXiv preprint arXiv:2010.14343 (2020). (Year: 2020).*

Nie, Weili, Arash Vahdat, and Anima Anandkumar. "Controllable and compositional generation with latent-space energy-based models." Advances in Neural Information Processing Systems 34 (2021): 13497-13510. (Year: 2021).*

Du, Y., et al., "Compositional Visual Generation with Energy Based Models", 34th Conference on Neural Information Processing Systems, pp. 1-11 (2020).

Ren, Yuzhuo; First Office Action for Chinese Patent Application No. 202210791127.4, filed Jul. 5, 2022, mailed Jan. 26, 2025, 12 pgs.

* cited by examiner

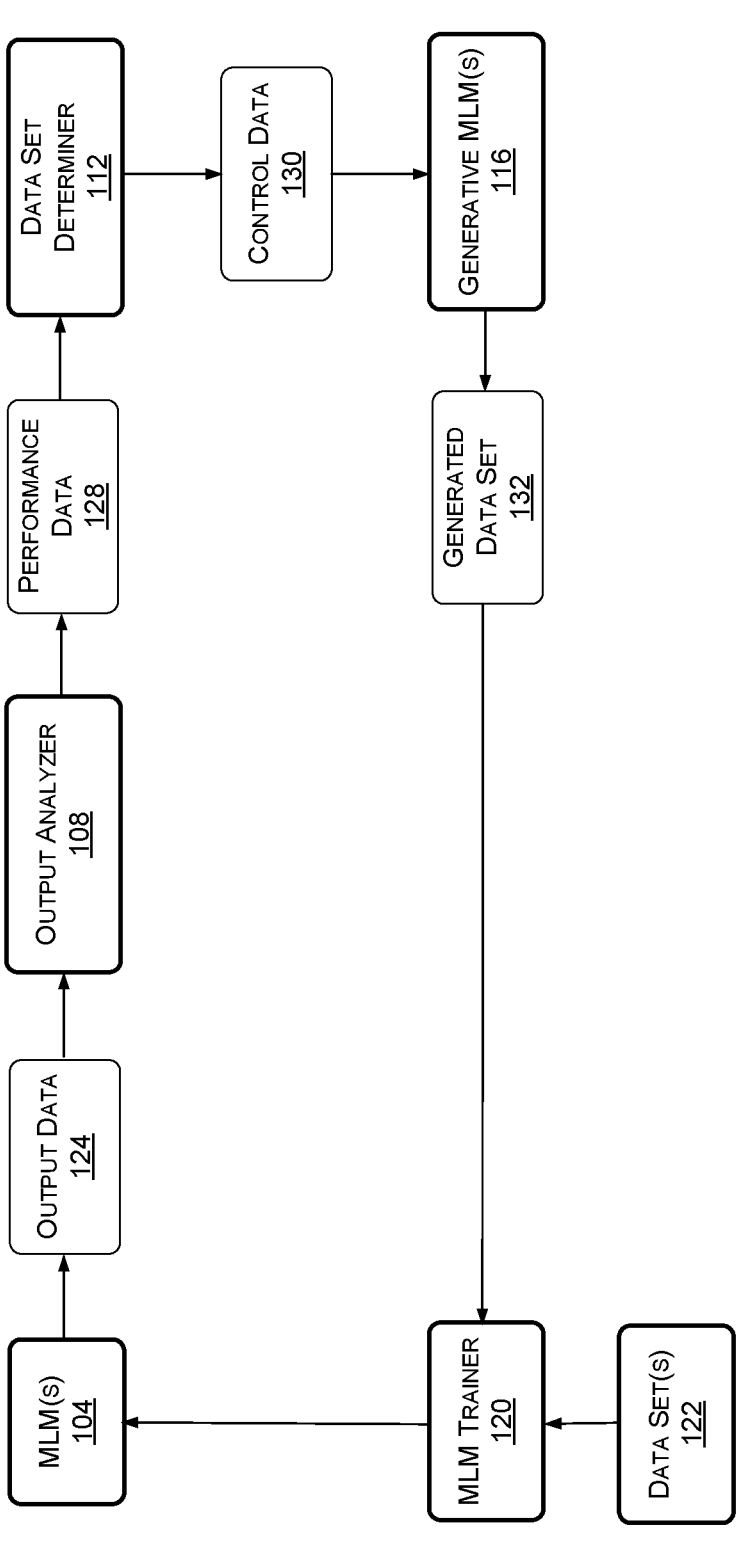
FIGURE 1

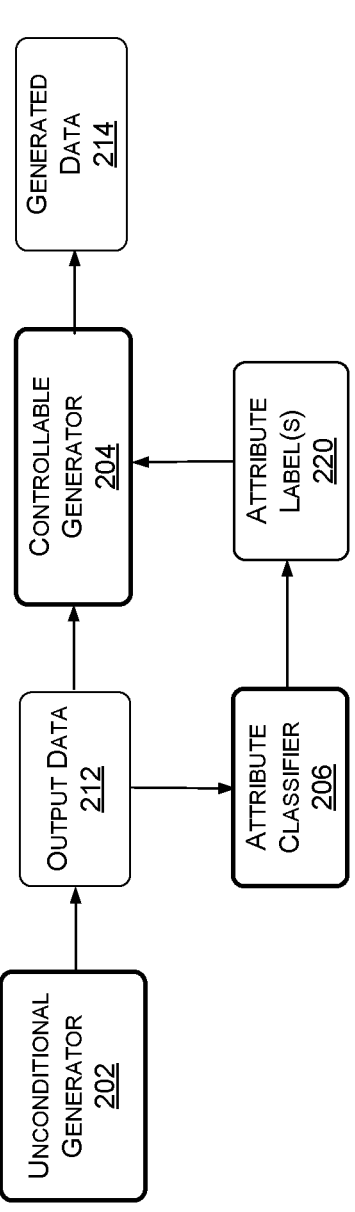
FIGURE 2

300

ANALYZE DATA CORRESPONDING AT OUTPUT OF AT LEAST
ONE MLM
B302

EVALUATE ONE OR MORE PERFORMANCE METRICS
B304

IDENTIFY AT LEAST ONE VALUE OF AT LEAST ONE
ATTRIBUTE
B306

APPLY AT LEAST ONE INPUT TO ONE OR MORE GENERATIVE
MLMs TO GENERATE ONE OR MORE SAMPLES THAT
CORRESPOND TO THE AT LEAST ONE VALUE
B308

TRAIN THE AT LEAST ONE MLM USING THE ONE OR MORE
SAMPLES
B310

400

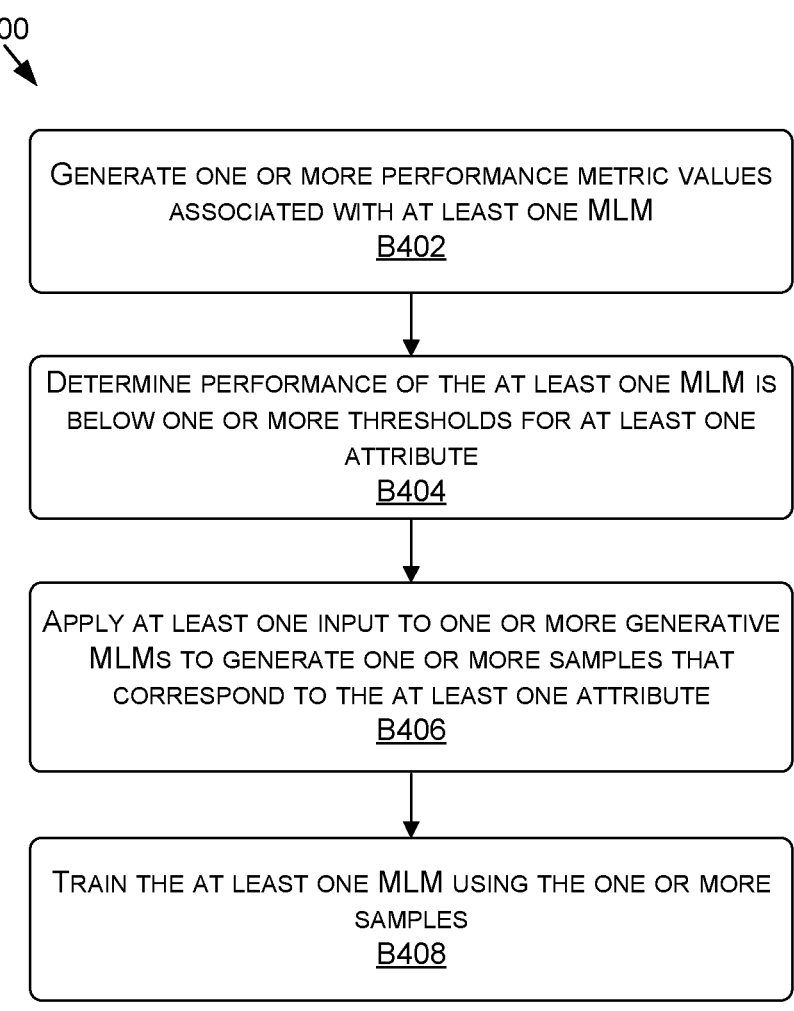

GENERATE ONE OR MORE PERFORMANCE METRIC VALUES
ASSOCIATED WITH AT LEAST ONE MLM
B402

DETERMINE PERFORMANCE OF THE AT LEAST ONE MLM IS
BELOW ONE OR MORE THRESHOLDS FOR AT LEAST ONE
ATTRIBUTE
B404

APPLY AT LEAST ONE INPUT TO ONE OR MORE GENERATIVE
MLMs TO GENERATE ONE OR MORE SAMPLES THAT
CORRESPOND TO THE AT LEAST ONE ATTRIBUTE
B406

TRAIN THE AT LEAST ONE MLM USING THE ONE OR MORE
SAMPLES
B408

FIGURE 4

FRAME ATTRIBUTE DETERMINER
504

FRAME ATTRIBUTES 516

EYE OPENNESS LEVEL: 0.9
EYE AMPLITUDE: 100 PIXELS
MOUTH OPEN AMPLITUDE: 300
PIXELS
HEAD NODDING ANGLE (R/P/
Y): 10/20/5
...

GENERATED
DATA SET
532

TEMPORAL PATTERN(S)
512

BLINK RATE
512A

EYE CLOSED
PERCENTAGE
512B

BLINK
AMPLITUDE
512C

YAWN
FREQUENCY
512D

BLINK
DURATION
512E

EYE VELOCITY
512F

DATA SET
ANALYZER
502

REFERENCE
DATA SET
508

800

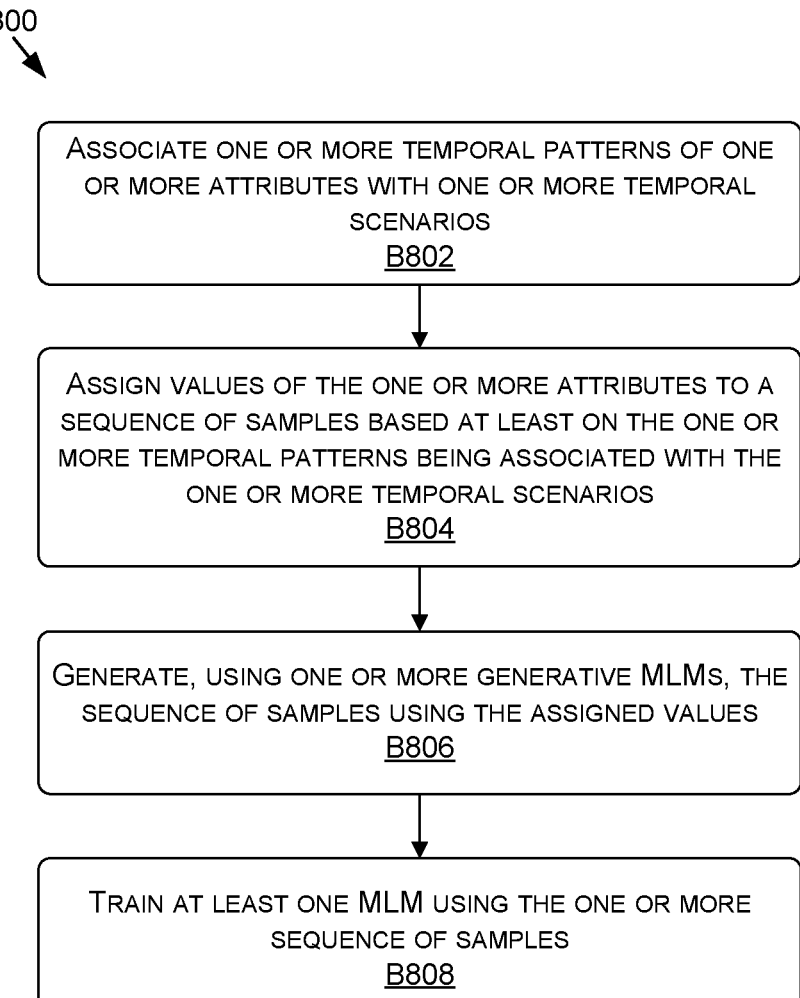

ASSOCIATE ONE OR MORE TEMPORAL PATTERNS OF ONE OR MORE ATTRIBUTES WITH ONE OR MORE TEMPORAL SCENARIOS
B802

ASSIGN VALUES OF THE ONE OR MORE ATTRIBUTES TO A SEQUENCE OF SAMPLES BASED AT LEAST ON THE ONE OR MORE TEMPORAL PATTERNS BEING ASSOCIATED WITH THE ONE OR MORE TEMPORAL SCENARIOS
B804

GENERATE, USING ONE OR MORE GENERATIVE MLMS, THE SEQUENCE OF SAMPLES USING THE ASSIGNED VALUES
B806

TRAIN AT LEAST ONE MLM USING THE ONE OR MORE SEQUENCE OF SAMPLES
B808

FIGURE 8

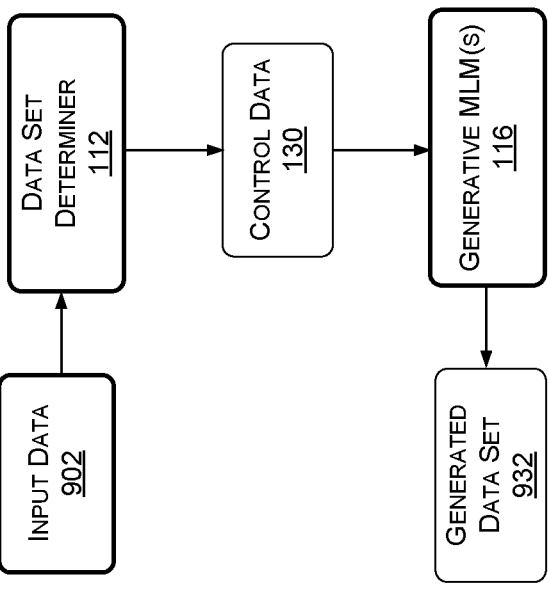
FIGURE 9

1000

RECEIVE INPUT DATA
B1002

ANALYZE THE INPUT DATA
B1004

GENERATE, USING ONE OR MORE GENERATIVE MLMS, ONE OR MORE SAMPLES BASED AT LEAST ON THE ANALYSIS
B1006

APPLY ONE OR MORE OF THE SAMPLES TO AT LEAST ONE MLM
B1008

1300

DATA SET GENERATION AND AUGMENTATION FOR MACHINE LEARNING MODELS

BACKGROUND

The performance of machine learning models (MLMs), such as deep neural networks (DNNs), may be improved through modifying the architecture of the MLMs or the data used to train the MLMs. Existing solutions attempt to improve the data used to train the MLMs by collecting more data. However, collecting real-world data is a laborious, costly, and time consuming task that requires countless human and compute resources. Even where large quantities of data can be collected, certain scenarios that should be captured to produce a robust and generalized model may be rare and constitute a low percentage of the data. Thus, an MLM may still perform poorly in these underrepresented scenarios.

Data augmentation techniques may be performed to reduce the amount of real-world data that needs to be collected to train an MLM. Existing data augmentation techniques include image rotation, flipping, cropping, or otherwise modifying existing data. These approaches can improve MLM accuracy when these variations are observed by a trained MLM. However, these approaches may not address accuracy issues related to underrepresented scenarios. For example, a face detection network may have lower accuracy if the data (e.g., faces) in the training data set is not sufficiently varied, or if certain characteristics are over- or under-represented in the training data set. Thus, while more data could be obtained using conventional data collection and augmentation techniques, existing solutions are unable to account for how much of specific types of data is needed to obtain a robust and generalized model.

SUMMARY

Embodiments of the present disclosure relate to attribute controllable generation of data sets for machine learning models. In embodiments, a generative neural network (GNN) may be used to generate samples of at least one class having one or more attributes based at least on a distribution of attributes for training, verification, and/or testing data.

In contrast to conventional approaches, such as those described above, disclosed approaches provide techniques for determining what types of data and how much data of particular types are needed for training, verification, and/or testing an MLM. In embodiments according to the present disclosure, an MLM(s) may be trained and evaluated, and one or more attribute-based performance metrics may be analyzed to identify one or more attributes and/or combinations of attributes for which the MLM is performing below an absolute and/or relative performance threshold. A GNN may be used to generate additional training data with one or more samples including compositions of multiple attributes, and the newly generated training data may be used to augment the pre-existing data in the data set used to train the MLM. In at least one embodiment, this process may be repeated until one or more criteria are satisfied. Aspects of the disclosure also provide for generating a data set for an MLM based at least on particular attributes (e.g., a list of attributes, indicators of the attributes, etc.) associated with at least one class to be represented in the data set. The present disclosure further provides for generating a temporal sequence of data items, such as frames of a video, which may form one or more samples of a data set. Sets of attribute values may be determined based at least on one or more temporal scenarios to be represented in the data set, and one or more GNNs may be used to generate the sequence to depict information corresponding to the attribute values.

BRIEF DESCRIPTION OF THE DRAWINGS

The present systems and methods for to attribute controllable generation of data sets for machine learning models are described in detail below with reference to the attached drawing figures, wherein:

FIG. 1 is an illustration of an example process that may be used to evaluate one or more machine learning models using attribute controllable generation of one or more data sets, in accordance with some embodiments of the present disclosure;

FIG. 2 is an illustration of an example process that may be performed to controllably generate data for one or more machine learning models based on one or more attributes, in accordance with some embodiments of the present disclosure;

FIG. 4 is a flow diagram showing a method for controllably generating one or more samples for one or more attributes using one or more performance metric values, in accordance with some embodiments of the present disclosure;

FIG. 8 is a flow diagram showing a method for controllably generating one or more samples based at least on associating one or more temporal patterns with one or more temporal scenarios, in accordance with some embodiments of the present disclosure;

FIG. 9 is an illustration of an example process that may be used for attribute controllable generation of one or more data sets, in accordance with some embodiments of the present disclosure;

DETAILED DESCRIPTION

Figure 3:
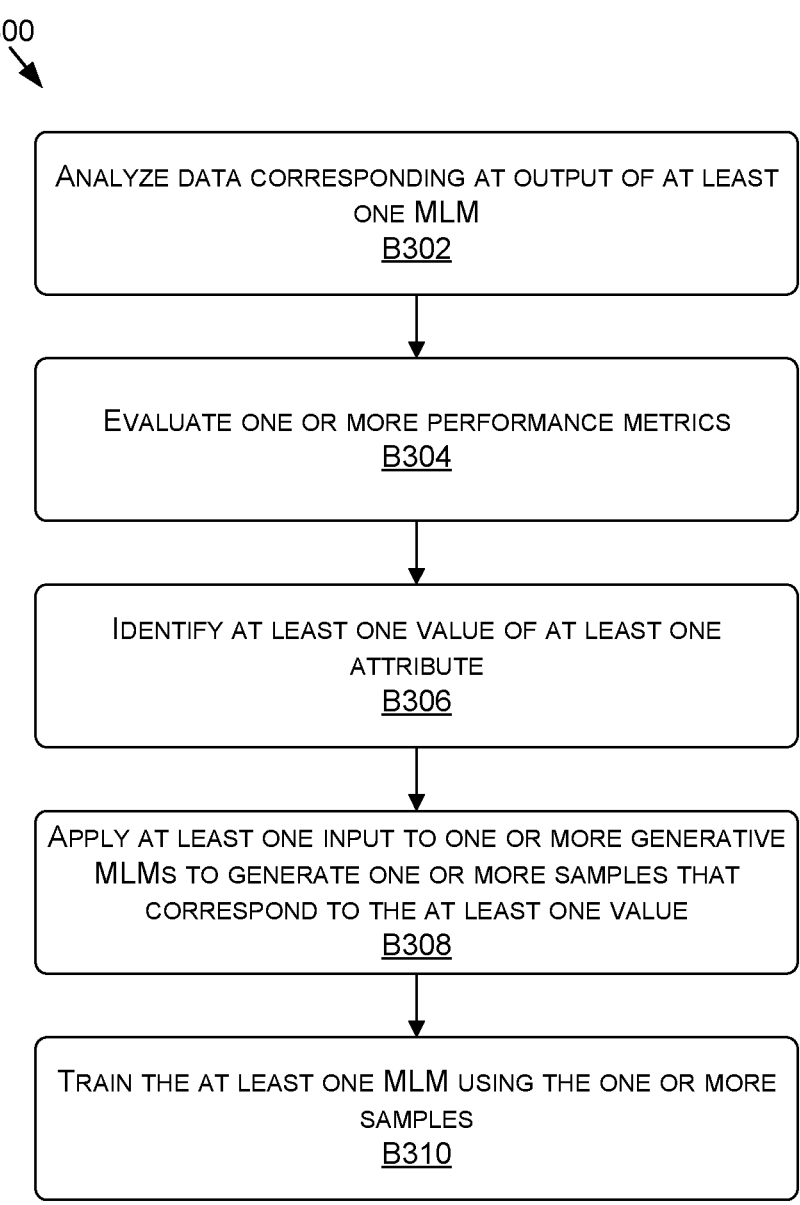
FIG. 3 is a flow diagram showing a method for controllably generating one or more samples based at least on evaluating one or more performance metrics for one or more attributes of one or more machine learning models, in accordance with some embodiments of the present disclosure.

Systems and methods are disclosed related to attribute controllable generation of data for training, verification, and testing machine learning models. Although the present disclosure may be described with respect to an example autonomous vehicle 1100 (alternatively referred to herein as "vehicle 1100" or "ego-vehicle 1100," an example of which is described with respect to FIGS. 11A-11D), this is not intended to be limiting. For example, the systems and methods described herein may be used by, without limitation, non-autonomous vehicles, semi-autonomous vehicles (e.g., in one or more adaptive driver assistance systems (ADAS)), piloted and un-piloted robots or robotic platforms, warehouse vehicles, off-road vehicles, vehicles coupled to one or more trailers, flying vessels, boats, shuttles, emergency response vehicles, motorcycles, electric or motorized bicycles, aircraft, construction vehicles, underwater craft, drones, and/or other vehicle types. In addition, although the present disclosure may be described with respect to face identification, face detection, facial landmark detection, eye-based drowsiness detection, and/or eye-open close detection or classification, this is not intended to be limiting, and the systems and methods described herein may be used in augmented reality, virtual reality, mixed reality, robotics, security and surveillance, simulation and digital twinning, autonomous or semi-autonomous machine applications, and/or any other technology spaces where machine learning models may be used.

In embodiments, a generative neural network (GNN), such as a generative adversarial network (GAN), may be used to generate samples of at least one class having one or more attributes based at least on a distribution of attributes for training, verification, and/or testing data.

In contrast to conventional approaches, such as those described above, disclosed approaches provide techniques for determining what types of data and how much data of a particular type(s) are needed for training, verification, and/or testing an MLM. In at least one embodiment, an MLM(s) may be trained using a training data set and evaluated. Rather than evaluating the overall performance of the MLM, the performance of the MLM may be evaluated using one or more key performance indicators (KPIs) which quantify MLM performance with respect to particular attributes and/or combinations of attributes. The attribute-based KPIs may be analyzed to identify one or more attributes and/or combinations of attributes for which the MLM is performing below an absolute and/or relative performance threshold (e.g., an accuracy threshold for inference). A GNN may be used to generate additional training data corresponding to the identified attributes. For example the GNN may generate one or more samples, where each sample may include composition of multiple attributes. The training data may be used to augment the training data set in training the MLM. In at least one embodiment, this process may be repeated until one or more criteria are satisfied, such as the KPIs indicate the MLM is performing at or above the performance threshold(s) for each attribute and/or combination of attributes.

As non-limiting examples, one or more attributes may relate to one or more portions of a person depicted in one or more images, such as one or more attributes that define an age of the person, a hair length of the person, a head position of the person, whether the person is wearing glasses, whether the person has a beard, an emotion of the person, a blink rate of the person, an eyelid open magnitude of the person, eye makeup of the person, a blink amplitude of the person, a blink duration of the person, a facial pattern of the person, whether the person is wearing a mask, lightning conditions of the person, or a facial expression of the person. Other examples of attributes include object background and/or foreground emphasis (e.g., visual emphasis and/or focus).

The content and/or portions of the person and/or other object(s) depicted in the one or more images may vary depending on the application. For example, for training an MLM for face identification, face detection or facial landmark detection, whole face images may be used which may be generated by the GNN (or cropped from a larger image generated by the GNN). For training an MLM for eye-based drowsiness detection or eye-open close detection, an eye crop region may be generated by the GNN (or cropped from a larger image generated by the GNN). Outputs of these MLMs may be useful for controlling one or more operations of a vehicle (e.g., driver attention monitoring, passenger profile/account management, etc.), such as the vehicle 1100, but have much wider applicability.

Aspects of the disclosure may also provide for generating a data set for an MLM, regardless of whether the MLM has been trained (e.g., beyond augmenting a training data set that was used to train the MLM). For example, at least some of an initial training data set may be generated based at least on particular attributes associated with at least one class to be represented in the data set. Additionally or alternatively, at least some of a verification and/or testing data set may be generated based at least on particular attributes associated with at least one class to be represented in the data set.

In one or more embodiments, a GNN may be used to generate one or more portions of a training, verification, and/or testing data set based at least on a set of attributes. For example, the GNN may be used to generate a training data set according to a distribution of the attributes and/or combination of the attributes desired for the training, verification, or testing data set and/or an overall data set from which one or more of those data sets are formed. An example of such a distribution includes an even distribution of attributes and/or combinations of attributes. Using such an approach, the data sets may be customized to particular scenarios associated with the attributes.

Disclosed approaches may be used to define and/or alter the distribution of attributes and/or combinations of attributes in a data set used for training, validation, and/or testing. By way of example and not limitation, at least 80% of the data may be reserved for training (e.g., 95%), and any remainder may be used for verification and/or testing (e.g., 5%). The verification and/or testing data set(s) may be augmented using a GNN to include additional one or more samples corresponding to underrepresented attributes and/or combinations thereof so as to include sufficient testing data for those scenarios.

The present disclosure further provides for generating a temporal sequence of data items, such as frames of a video, which may form one or more samples of a training, validation, and/or testing data set. In at least one embodiment, frames of a sequence of frames (or more generally samples) may be assigned sets of one or more attribute values to be depicted within the frames (or more generally represented or embodied by the samples). The sets of attribute values may be determined based at least on one or more temporal scenarios to be represented using the one or more attribute values. For example, a temporal scenario may be mapped to attribute values for frames and one or more GNNs may be used to generate the frames to depict visual information corresponding to the attribute values. Non-limiting examples of temporal scenarios include those involving one or more eye blink patterns (e.g., blink frequency, amplitude, velocity, duration, etc.), one or more facial patterns (e.g., yawning, not yawning, etc.), and/or one or more head positions (e.g., nodding off, alert, etc.).

In at least one embodiment, a temporal scenario may correspond to one or more ground truth inferences to be made by the MLM based at least on the generated sample(s). By way of example, and not limitation, where the MLM is to infer a drowsiness level, the drowsiness level may be mapped to the sets of one or more attribute values. Various approaches may be used to determine temporal patterns for the one or more attributes based on the one or more ground truth inferences. For example, temporal patterns for attributes and/or combinations of attributes may be determined based at least on analyzing and/or identifying corresponding temporal patterns for real-world or observed data corresponding to the one or more ground truth inferences.

The systems and methods described herein may be used by, without limitation, non-autonomous vehicles, semi-autonomous vehicles (e.g., in one or more adaptive driver assistance systems (ADAS)), piloted and un-piloted robots or robotic platforms, warehouse vehicles, off-road vehicles, vehicles coupled to one or more trailers, flying vessels, boats, shuttles, emergency response vehicles, motorcycles, electric or motorized bicycles, aircraft, construction vehicles, underwater craft, drones, and/or other vehicle types. Further, the systems and methods described herein may be used for a variety of purposes, by way of example and without limitation, for machine control, machine locomotion, machine driving, synthetic data generation, model training, perception, augmented reality, virtual reality, mixed reality, robotics, security and surveillance, autonomous or semi-autonomous machine applications, deep learning, environment simulation, object or actor simulation and/or digital twinning, data center processing, conversational AI, light transport simulation (e.g., ray-tracing, path tracing, etc.), collaborative content creation for 3D assets, cloud computing and/or any other suitable applications.

Disclosed embodiments may be comprised in a variety of different systems such as automotive systems (e.g., a control system for an autonomous or semi-autonomous machine, a perception system for an autonomous or semi-autonomous machine), systems implemented using a robot, aerial systems, medial systems, boating systems, smart area monitoring systems, systems for performing deep learning operations, systems for performing simulation operations, systems for performing digital twin operations, systems implemented using an edge device, systems incorporating one or more virtual machines (VMs), systems for performing synthetic data generation operations, systems implemented at least partially in a data center, systems for performing conversational AI operations, systems for performing light transport simulation, systems for performing collaborative content creation for 3D assets, systems implemented at least partially using cloud computing resources, and/or other types of systems.

With reference to FIG. 1, FIG. 1 is an illustration of an example process 100 that may be used to evaluate one or more machine learning models using attribute controllable generation of one or more data sets, in accordance with some embodiments of the present disclosure. Various components are shown in FIG. 1 and other figures herein. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory. In some embodiments, the systems, methods, and processes described herein may be executed using similar components, features, and/or functionality to those of example autonomous vehicle 1100 of FIGS. 11A-11D, example computing device 1200 of FIG. 12, and/or example data center 1300 of FIG. 13.

FIG. 1 shows components of a system, which may include one or more machine learning models (MLMs) 104, an output analyzer 108, a data set determiner 112, one or more generative MLMs 116, and an MLM trainer 120.

At a high level, the process 100 may include the MLM(s) 104 receiving one or more inputs, such as one or more samples of a data set 122 (e.g., a training data set), and generating one or more outputs, such as output data 124 (e.g., tensor data) from the one or more inputs. As indicated in FIG. 1, the data set 122 may be applied to the MLM 104 by the MLM trainer 120. However, the data set 122 may be applied to the MLM 104 by a different MLM trainer. The process 100 may also include the output analyzer 108 receiving one or more inputs, such as the output data 124, and generating one or more outputs, such as performance data 128 (e.g., representing one or more performance metrics for at least one attribute) from the one or more inputs. The data set determiner 112 may receive one or more inputs, such as the performance data 128, and generate one or more outputs, such as control data 130 (e.g., at least one input corresponding to at least one value of at least one attribute) from the one or more inputs. The generative MLM(s) 116 may receive one or more inputs, such as the control data 130, and generate one or more outputs, such as a generated data set 132 from the one or more inputs. The process 100 may repeat any number of iterations. For subsequent iterations, the MLM trainer 120 may apply at least a portion of the generated data set 132 from one or more previous iterations to the MLM 104 to train and/or refine the MLM 104. In at least one embodiment, the data set determiner 112 may determine in any instance of the process 100 that the performance of the MLM 104 is sufficient and/or to otherwise end the process 100 without generating the generated data set 132. The MLM 104 may be deployed and/or subjected to additional verification, testing, and/or adaptation based at least on the determination.

The MLM(s) 104 and other MLM(s) described herein may include any type of machine learning model, such as a machine learning model(s) using linear regression, logistic regression, decision trees, support vector machines (SVM), Naïve Bayes, k-nearest neighbor (Knn), K means clustering, random forest, dimensionality reduction algorithms, gradient boosting algorithms, neural networks (e.g., auto-encoders, convolutional, recurrent, perceptrons, Long/Short Term Memory (LSTM), Hopfield, Boltzmann, deep belief, deconvolutional, generative adversarial, liquid state machine, etc.), and/or other types of machine learning models. In various examples, an MLM may include one or more convolutional neural networks.

By way of example, and not limitation, the MLM 104 may include one or more face detection networks, face identification networks, facial landmark detection networks, eye open-closed classification networks, emotion classification networks, and/or drowsiness detection networks. For example, the MLM 104 may be trained, at least in part using the MLM trainer 120, for face identification, face detection, facial landmark detection, eye-based drowsiness detection, and/or eye-open close detection or classification.

The data set 122 may include training, verification, or testing data. For example, the data set 122 may be used by the MLM trainer 120 for training the MLM 104, for verifying the MLM 104, or for testing the MLM 104. Similarly, the generated data set(s) 132 from one or more iterations of the process 100 may be used by the MLM trainer 120 for training the MLM 104, for verifying the MLM 104, or for testing the MLM 104 and/or one or more other MLMs. The generated data set 132 may be applied in the next iteration of the process, and more generally one or more samples from the generated data set 132 may be applied to the MLM 104 and/or may be used to generate one or more samples applied to the MLM 104. In at least one embodiment, one or more samples from the generated data set 132 may be used by the MLM trainer 120 to augment the one or more samples of the data set 122 and/or a data set used to previously train the MLM 104. For example, the MLM trainer 120 may retrain the MLM 104 (or train a different MLM) using the augmented data set comprising the samples from the generated data set 132 and the samples from the data set used to previously train the MLM 104, or may use the samples from the generated data set 132 to refine the trained MLM 104.

Such application of the generated data set 132 may occur periodically, continuously, sequentially, or at any suitable regularity across the iterations of the process 100. In one or more embodiments, the data set(s) 122 may be applied to the MLM 104 over a number of the iterations of the process 100 to multiple instances of the generated data set 132, which may then be selected from and/or combined for application to the MLM 104 and/or one or more other MLMs for training, verification, and/or testing.

In one or more embodiments, the data set 122 and/or the generate data set 132 may define one or more samples applied to the MLM 104 by the MLM trainer 120 in the process 100. The samples may correspond to at least one class having one or more attributes (e.g., an output class of the MLM 104). Examples of attributes for machine learning models being used for generating inferences on images (e.g., photographs or renderings) of faces may include, by way of example and not limitation, age, ethnicity, long/short hair, hair length, eye open/closed, eye opened amount, glasses present/not present, beard present/not present, head (or other body part) or body direction or pose, illumination condition (e.g., shadowed, well lit, illumination color, illumination amount, etc.), emotion (e.g., happy, sad, neutral, etc.), eye makeup presence and/or type, and/or drowsiness level.

The output analyzer 108 may be configured to generate the performance data 128 using the output data 124. The output data 124 may represent one or more outputs from the MLM(s) 104. In at least one embodiment, the output data 124 may include at least a portion of tensor data from the MLM 104. The output analyzer 108 may generate the performance data 128 based at least on analyzing the output data 124. The analysis of the output data 124 may be performed using various approaches. In at least one embodiment, the output analyzer 108 may post process at least some of the output data 124, for example, to determine one or more inferred or predicted outputs of the MLM 104 (e.g., one or more outputs the MLM 104 is trained to or is being trained to infer). The output analyzer 108 may analyze the post processed data to determine the performance data 128. Additionally or alternatively, the output analyzer 108 may analyze one or more portions of the output data 124 using one or more MLMs trained to predict the performance data 128 at least in part based on the output data 124.

In at least one embodiment, the output analyzer 108 may, based at least on the analyzing of the output data 124, determine and/or generate one or more performance metrics represented by at least a portion of the performance data 128. A performance metric determined using the output analyzer 108 may be for one or more attributes of samples applied to the MLM 104 to generate the output data 124 and may correspond at least one of the samples. For example, rather than evaluating the overall performance of the MLM 104, the output analyzer 108 may evaluate the performance of the MLM 104 using one or more key performance indicators (KPIs), which quantify and/or correspond to performance of the MLM 104 with respect to one or more values of particular attributes and/or combinations of attributes. For example, for a face detection network, a KPI may correspond to how accurately the MLM 104 predicted a face was present when an input sample depicted a person with a mask vs. without a mask (e.g., a first attribute with values representing present or not present), and/or with a short beard vs a longer beard (e.g., a second attribute with values representing one or more beard lengths).

In at least one embodiment, the output analyzer 108 may evaluate the samples using ground truth predictions for the samples to determine one or more performance metrics indicating whether the MLM 104 made a correct or incorrect prediction for one or more corresponding samples. In at least one embodiment, the output analyzer 108 may evaluate the samples using ground truth predictions for the samples to determine one or more performance metrics indicating how close the prediction(s) made by the MLM 104 is to one or more ground truth predictions for one or more corresponding samples. The one or more performance metrics may correspond to one or more attributes, as described herein. For example, a performance metric for one or more attributes may account for performance when one or more values of the one or more attributes are and/or were determined to be embodied by the one or more samples corresponding to the performance metric.

In at least one embodiment, the output analyzer 108 may use attribute labels of one or more samples, which may indicate the one or more samples represent the one or more attributes and/or values thereof. For example, each sample may be labeled with one or more attributes and/or attribute values determined to be embodied by or associated with the sample. The output analyzer 108 may use samples having an attribute label corresponding to an attribute to compute a performance metric that is at least partially based on that attribute. One or more of the attribute labels may be assigned to one or more of the samples using human labeling and/or machine labeling (e.g., using one or more MLMs to predict one or more attributes and/or values thereof).

Various types of performance metrics may be used. Non-limiting examples include those based at least on mean squared error (MSE), normalized MSE, root MSE, R-squared, true positive rate, false positive rate, F-score or F-measure, accuracy, precision, recall, intersection over union or Jaccard index, mean average percentage error, an error rate, etc. As a simple example, a performance metric value of 50% for an attribute may be based on the output analyzer 108 determining the MLM 104 provided correct predictions 50% of the time when a sample corresponded to the attribute (e.g., had a corresponding attribute label).

The data set determiner 112 may analyze the performance data 128 to generate the control data 130 for the generative MLM 116. For example, the data set determiner 112 may generate the control data 130 based at least on one or more of the performance metrics (e.g., attribute-based KPIs) determined using the output analyzer 108. The data set determiner 112 may determine one or more characteristics for the generated data set 132 based at least on the analysis of the performance data 128 and provide the control data 130 corresponding to the one or more characteristics so as to produce the generated data set 132.

In at least one embodiment, the data set determiner 112 analyzes the one or more performance metrics to identify one or more attributes and/or combinations of attributes and/or attributes values for which the MLM 104 is performing below an absolute and/or relative performance threshold. For example, an attribute (and/or attribute value) may be identified or selected by the data set determiner 112 based at least on a value(s) of a performance metric for the attribute (and/or attribute value) indicating lower performance for the attribute (and/or attribute value) relative to a value(s) of the performance metric for at least one other attribute(s). An example is to select attributes or attribute values based at least on being the three worst performing attributes and/or attribute values and/or based at least on corresponding to performance that is below a threshold that is computed based on performance for multiple attributes and/or attribute values. Additionally or alternatively, an attribute (and/or attribute value) may be identified or selected by the data set determiner 112 based at least on a value(s) of a performance metric for the attribute (and/or attribute value) indicating lower performance for the attribute (and/or attribute value) relative to a threshold value(s), which may not be specific to the attribute (and/or attribute value) being considered. An example is to select any attribute (and/or attribute value) or combination of attributes (and/or attribute values) based at least on corresponding inference accuracy being less than 65%.

Additionally or alternatively, the data set determiner 112 may comprise one or more MLMs trained to determine the one or more characteristics and/or generate the control data 130 based at least on one or more portions of the performance data 128 and/or the output data 124, such as the one or more performance metrics and/or one or more portions of the output data 124 or data generated therefrom as inputs to the MLM(s).

An example of the one or more characteristics includes a quantity of samples in the generated data set 132 to include the one or more attributes and/or combination of attributes (and/or attribute values). For example, the quantity of samples for an attribute (and/or attribute value) may be based at least on a value of the performance metric for that attribute (and/or attribute value). By way of example and not limitation, the quantity may increase with or otherwise be based at least on the distance of the value from a threshold value, such as a threshold value used to identify or select the attribute (and/or attribute value). Additionally or alternatively, the one or more characteristics may include an allocation of the samples to a distribution of samples that are to be generated using the generative MLMs 116. For example, a fixed or computed number of samples to be generated using the generative MLMs 116 may be allocated amongst the attributes, attribute values, and/or combination of attributes (e.g., based at least on corresponding values of one or more performance metrics). By way of example and not limitation, the allocation for an attribute (and/or attribute value) may increase with or otherwise be based at least on a value of a performance metric for the attribute (and/or attribute value) relative to the value(s) for one or more other attributes (and/or attribute value). What is described herein for an attribute may also refer to a single attribute or a combination of attributes (a composite attribute). Further what is described herein for an attribute value may refer to a single attribute value or a combination of attribute values.

In various examples, the data set determiner 112 may analyze the performance data 128 (e.g., the one or more performance metrics) across attributes to identify poorly performing composite attributes formed by a combination of attributes. Doing so can allow for identifying poorly performing edge or corner cases that may not be sufficiently represented in the data used to train the MLM 104. For example, the MLM 104 may perform well overall when a child is in an image input to the MLM 104 and perform well overall when a person with glasses is in an image input to the MLM 104. However, the MLM 104 may not perform well if a child with glasses is in an image input to the MLM 104. By way of example, here "child" may refer to a particular range of age values identified by the data set determiner 112 based on analyzing performance for an age attribute. As another example, "child" may refer to a binary value of an attribute that indicates whether a child is or is not present and is identified by the data set determiner 112. This type of composite training data may have been underrepresented in the data used to train the MLM 104. By analyzing the performance data 128 across attributes, the data set determiner 112 may determine to generate one or more additional samples for these cases.

As described herein, in at least one embodiment, the data set determiner 112 may determine in any instance of the process 100 that the performance of the MLM 104 is sufficient and/or to otherwise the process 100 and/or iterations thereof may end at any point (e.g., without generating the generated data set 132). For example, the analysis of the performance data 128 may result in the data set determiner 112 not selecting any attributes and/or combinations of attributes for the generated data set 132, the MLM 104 may reach a threshold level of performance, the process 100 may be performed a threshold number of iterations, and/or a threshold number of samples may have been generated.

In one or more embodiments, the control data 130 for the generative MLM 116 may represent at least one input to the generative MLM 116 corresponding to at least one attribute, which causes the generative MLM 116 to generate one or more samples that embody the at least one attribute having the at least one value. Using the example of a child with glasses, the at least one input may cause the generative MLM 116 to generate one or more images that depict a child with glasses. Where the at least one value corresponds to a range of values, the control data 130 may randomly sample, indicate the range, or otherwise cause a sample selected from the range to be generated. In one or more embodiments, the generative MLM(s) 116 may perform compositional generation of attributes in latent space (e.g., compositions of distributions).

While any suitable generative MLM(s) and processes may be used to generate the generated data set 132, FIG. 2 provides an example of a suitable approach. Referring now to FIG. 2, FIG. 2 is an illustration of an example process 200 that may be performed to controllably generate data for one or more machine learning models based on one or more attributes, in accordance with some embodiments of the present disclosure. FIG. 2 shows components of a system, which may include an unconditional generator 202, a controllable generator 204, and an attribute classifier 206. In one or more embodiments, the unconditional generator 202, the controllable generator 204, and the attribute classifier 206 may form at least a portion of the generative MLM 116 of FIG. 1.

At a high level, the process 200 may include the unconditional generator receiving one or more inputs, such as at least a portion of the control data 130 (e.g., one or more inputs used to generate one or more samples), and generating one or more outputs, such the output data 212 from the one or more inputs. The process 200 may be used to generate images or videos in various sensor modalities, such as and without limitation, RGB sensor, IR sensor, thermal sensor, etc. The process 100 may also include the attribute classifier 206 receiving one or more inputs, such as the output data 212, and generating one or more outputs, such as attribute labels 220. The process 100 may also include the controllable generator 204 receiving one or more inputs, such as the output data 212 and the attribute labels 220, and generating one or more outputs, such generate data 214, which may include at least a portion of the generated data set 132.

In at least one embodiment, the at least one input guides the unconditional generator 202 (an unconditional generative model) in generating a sample(s) using an energy function that defines semantics of an attribute to be embodied by the sample. For example, energy-based models (EBMs) can be used to handle compositional generation over a set of attributes. This may be due at least in part to the ability to combine energy functions in EBMs representing different semantics to form compositional image generators. EBMs can be difficult to train in pixel space on high-resolution images, but to make them scalable to high-resolution image generation a formulation can be used in a latent space of a pre-trained generative model, such as the unconditional generator 202. A non-limiting example of the unconditional generator 202 includes one or more Style Generative Adversarial Network (StyleGANs). In one or more embodiments, the unconditional generator 202 may include a mapping network to map points in latent space to an intermediate latent space. The intermediate latent space may be used to control style at each point in the generator model of the unconditional generator 202, and the introduction of noise as a source of variation at each point in the generator model.

Given a pre-trained generator, controllable generation can be obtained, at least in part, by training the attribute classifier 206, where the controllable generator 204 may perform sampling efficiently in the latent space. Whenever introducing new attributes, energy functions of new attributes can be combined with existing energy functions to form a new EBM without training generative models from scratch. Such a plug-and-play method can be relatively simple, fast to train, and efficient for the controllable generator 204 to sample, with excellent performance in compositional generation.

In one or more embodiments, an EBM can be built in a joint space of data and attributes where marginal data distribution is denoted by an implicit distribution (e.g., the pre-trained GAN generator), and a conditional distribution of attributes, given data, is represented by the attribute classifier 206. Using reparameterization, an EBM formulation can induce a joint energy function in this latent space where a latent distribution is known (a standard Gaussian distribution). The attribute classifier 206 may then only need to be trained in this data space, with sampling performed by the controllable generator 204 in this latent space, for example, using an ordinary differential equation (ODE) solver. Thus, adding controllability may only require training the attribute classifier 206 based on semantics of the attributes.

Now referring to FIG. 3, each block of method 300, and other methods described herein, comprises a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a standalone application, a service or hosted service (standalone or in combination with another hosted service), or a plug-in to another product, to name a few. The methods may be described, by way of example, with respect to particular systems and/or processes. However, these methods may additionally or alternatively be executed by any one system, or any combination of systems, including, but not limited to, those described herein.

FIG. 3 is a flow diagram showing a method 300 for controllably generating one or more samples based at least on evaluating one or more performance metrics for one or more attributes of one or more machine learning models, in accordance with some embodiments of the present disclosure. The method 300, at block B302, includes analyzing data corresponding to output of at least one MLM. For example, the output analyzer 108 may analyze the output data 124.

The method 300, at block B304 includes evaluating one or more performance metrics. For example, the data set determiner 112 may use the performance data 128 to evaluate, based at least on the analyzing, one or more performance metrics for one or more attributes of samples applied to the MLM 104 to generate the output data 124.

The method 300, at block B306 includes identifying at least one value of at least one attribute. For example, the data set determiner 112 may identify at least one value of at least one attribute of the one or more attributes based at least on the evaluating.

The method 300, at block B308 includes applying at least one input to one or more generative MLMs to generate one or more samples that correspond to the at least one value. For example, the data set determiner 112 may apply the control data 130 to the generative MLM 116 to generate one or more samples that correspond to the at least one value based at least on the identifying.

The method 300, at block B310 includes training the at least one MLM using the one or more samples. For example, the MLM trainer 120 may train the MLM 104 based at least on applying the one or more samples to the MLM 104.

Now referring to FIG. 4, FIG. 4 is a flow diagram showing a method 400 for controllably generating one or more samples for one or more attributes using one or more performance metric values, in accordance with some embodiments of the present disclosure. The method 400, at block B402, includes generating one or more performance metric values associated with at least one MLM. For example, the output analyzer 108 may generate one or more performance metric values corresponding to one or more attributes of one or more objects depicted in first one or more images applied to the MLM 104.

The method 400, at block B404 includes determining performance of the at least one MLM is below one or more thresholds for at least one attribute. For example, the data set determiner 112 may determine, using the one or more of the performance metric values, performance of the MLM 104 is below one or more thresholds for at least one value of at least one attribute of the one or more attributes.

The method 400, at block B406 includes applying at least one input to one or more generative MLMs to generate one or more samples that correspond to the at least one attribute. For example, the data set determiner 112 may apply the control data 130 to the generative MLM 116 to generate one or more samples that correspond to the at least one value based at least on the performance being below the one or more thresholds for the at least one value.

The method 400, at block B408 includes training the at least one MLM using the one or more samples. For example, the MLM trainer 120 may train the MLM 104 using the one or more samples.

Figure 5:
FIG. 5 is an illustration of an example process that may be performed to controllably generate data for one or more machine learning models based on temporal patterns for one or more attributes, in accordance with some embodiments of the present disclosure.

Referring now to FIG. 5, FIG. 5 is an illustration of an example process 500 that may be performed to controllably generate data for one or more machine learning models based on temporal patterns for one or more attributes, in accordance with some embodiments of the present disclosure.

The process 500 may be used for generating a temporal sequence of data items, such as frames of a video, which may form one or more samples of an augmented, training, validation, and/or testing data set, such as the generated data set 132 or other data sets described herein. In at least one embodiment, the data set determiner 112 may assign frames of a sequence of frames sets of one or more attribute values to be depicted within the frames. The sets of attribute values may be determined based at least on one or more temporal scenarios to be represented using the one or more attribute values. For example, the data set determiner 112 may map a temporal scenario to attribute values for frames and the generative MLM 116 may be used to generate the frames to depict visual information corresponding to the attribute values.

Figure 6:
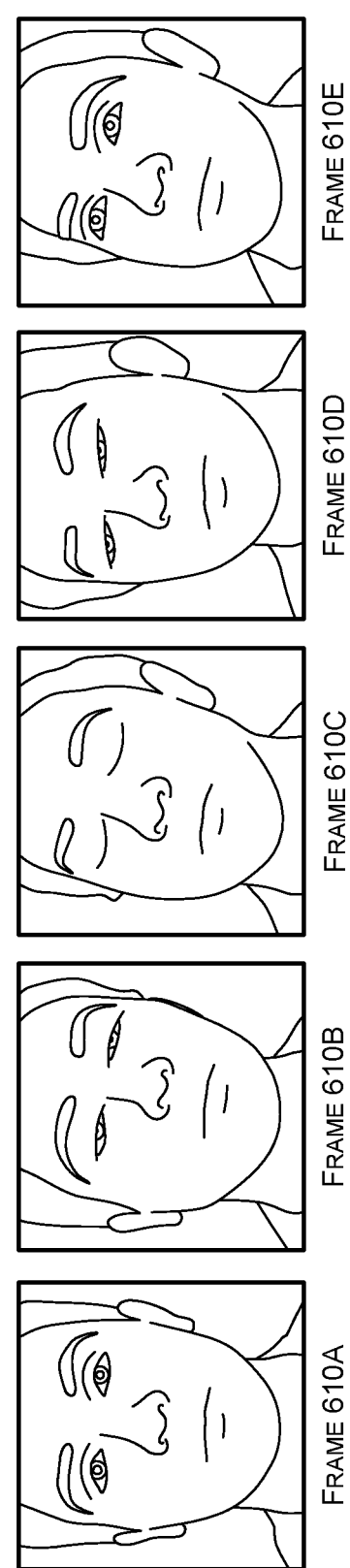
FIG. 6 is an illustration of an example of frames which may be generated to capture at least a portion of a temporal scenario, in accordance with some embodiments of the present disclosure.

Referring now to FIG. 6, FIG. 6 is an illustration of an example of frames which may be generated to capture at least a portion of a temporal scenario, in accordance with some embodiments of the present disclosure. For example, FIG. 6 shows a video 600 including a sequence of frames 610A, 610B, 610C, 610D, and 610D (also referred to as "frames 610"), which may be generated using a generative MLM, such as the generative MLM 116, using attribute values sets of attribute values assign to the frames. In one or more embodiments, at least one of the frames of the frames 610 may be generated using interpolation. The frames 610 may form an animation, where at least some of the attribute values may be configured to across the frames 610, cause one or more aspects of the video 600 to be animated. By way of example, and not limitation, the attribute values for the frames 610 include values for a head position and percentage of eye closed. These attributes may be used to simulate one or more temporal scenarios across the frames 310, such as drowsiness. For example, drowsiness may be simulated based at least on controlling the head position and blink or other eye patterns to simulate nodding off. In at least one embodiment, the MLM 104 and/or another MLM may be trained to predict or infer one or more aspects of the temporal scenario (e.g., the presence, the likelihood, the level, etc.) using the simulated temporal scenario. My way of example, and not limitation, the process 500 may be used to identify temporal patterns and/or other characteristics of attributes associated with the temporal scenario.

FIG. 5 shows components of a system, which may include a data set analyzer 502 and a frame attribute determiner 504. At a high level, the process 500 may include the data set analyzer 502 receiving one or more inputs, such as one or more samples of a reference data set 508 (e.g., a real-world data set, which may be known to represent one or more temporal scenarios), and generating one or more outputs, such as temporal patterns 512 from the one or more inputs. The process 500 may also include the frame attribute determiner 504 receiving one or more inputs, such as the temporal patterns 512, and generating one or more outputs, such as frame attributes 516 (e.g., for one or more frames) from the one or more inputs. A generated data set 532 may be produced that corresponds to the frame attributes 516. In at least one embodiment, the frame attribute determiner 504 may be part of the data set determiner 112 of FIG. 1. Thus, the generated data set 532 may correspond to the generated data set 132 of FIG. 1. However, in one or more embodiments, the process 500 need not be used with the process 100. In any embodiment, the generative MLM 116 may be used to produce the generated data set 532.

In one or more embodiments, the reference data set 508 may include real-world and/or simulated data. By way of example, and not limitation, the reference data set 508 may include fatigue or drowsiness data, which may be capture one or more temporal scenarios, such as drowsiness or sleepiness. For example, the reference data set 508 may include a set of frames forming a video (e.g., over a minute long at 24 frames per second, 30 frames per second, 60 frames per second, etc.) with each set of frames being labeled or otherwise associated with a temporal scenario and/or one or more values of the temporal scenario. In the present example, the one or more values may depict and be associated with and/or assigned a value, state, and/or level corresponding to a Karolinska Sleepiness Scale (K55), an Epworth Sleepiness Scale (ESS), a Stanford Sleepiness Scale (SSS), a Johns Drowsiness Scale (JDS), and/or an Observer Rated Drowsiness (ORD). The data set analyzer 502 may be used to determine one or more temporal patterns for one or more attributes that correspond to the those temporal scenarios and/or values so as to generate frame attributes 516 to simulate those aspects of the reference data set 508 using a generative MLM. For example, the frame attribute determiner 504 may determine the frame attributes 516 for frames using the temporal patterns 512 the data set analyzer 502 associated with a KSS level of 8 and/or an ORD state of "Not drowsy" to generate the video 600. The video 600 may then be used, for example, to train one or more MLMs, such as the MLM 104, to predict the KSS level and/or ORD state using the video. In one or more embodiments, the KSS level and/or ORD state used to determine the frame attributes 516 may be used as ground truth for the video.

Figure 7:
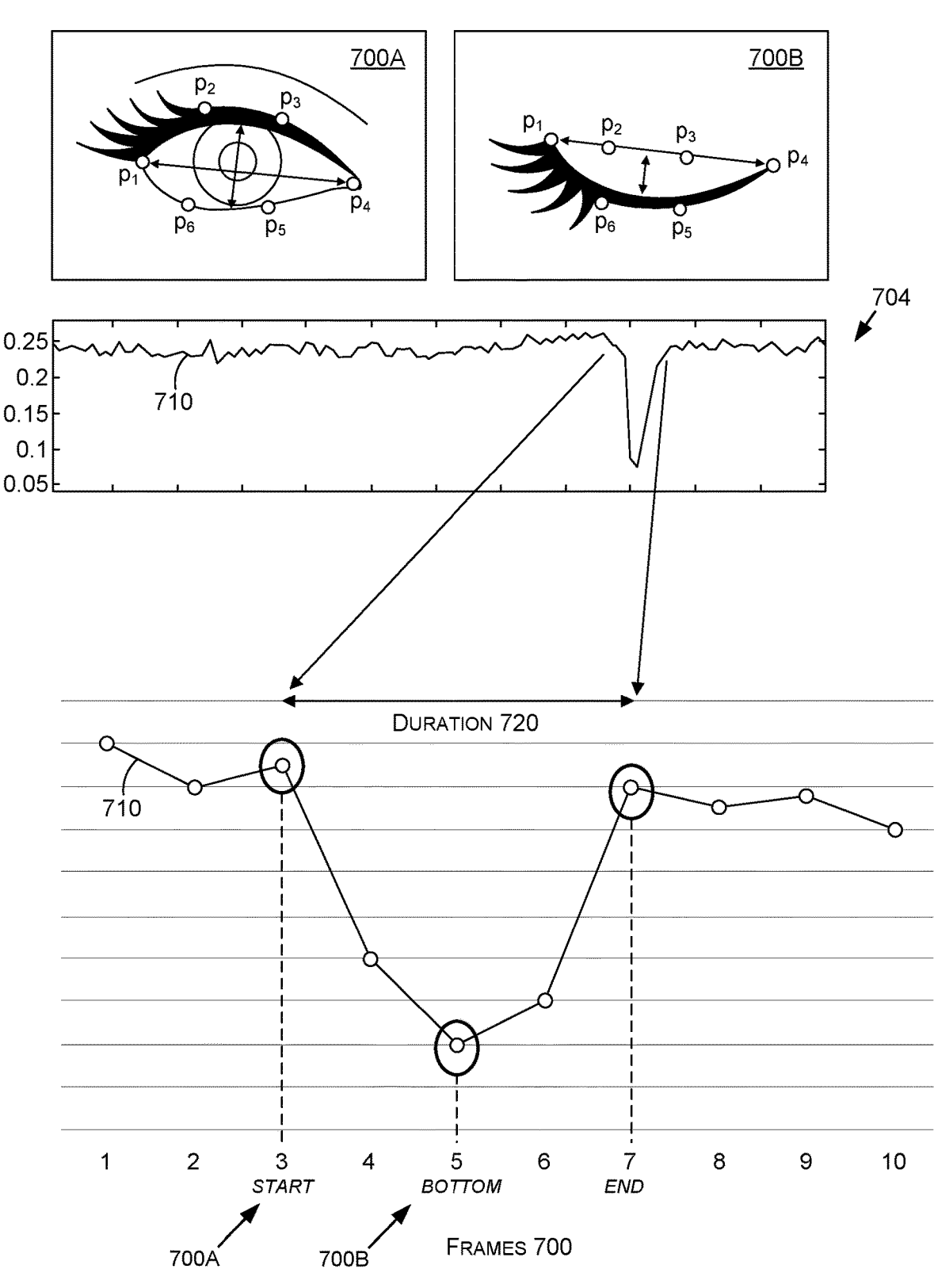
FIG. 7 is an illustration used to describe examples of how one or more temporal patterns may be extracted from a reference data set, in accordance with some embodiments of the present disclosure.

FIG. 5 shows non-limiting examples of the temporal patterns 512, examples of which include blink rate 512A, eye closed percentage 512B, blink amplitude 512C, yawn frequency 512D, blink duration 512E, and eye velocity 212F. Referring now to FIG. 7, FIG. 7 is an illustration used to describe examples of how one or more of the temporal patterns 512 may be extracted from the reference data set 508, in accordance with some embodiments of the present disclosure.

FIG. 7 shows a frame 700A and a frame 700B of frames 700, which may belong to a video of the reference data set 508, and which may be analyzed using the data set analyzer 502 to determine one or more of the temporal patterns 512. In at least one embodiment, the data set analyzer 502 may determine one or more landmarks in the frames 700, and measure or otherwise track or monitor the one or more landmarks across one or more of the frames 700 to determine one or more temporal patterns. Examples of the landmarks include the landmark points P1, P2, P3, P4, P6, and P6, which may be measured and/or evaluated to determine one or more attributes of one or more of the frames (e.g., a temporal patterns across the frames). The landmark points may be determined using any suitable approach, such as a landmark MLM trained to identify the landmarks.

In at least one embodiment, the data set analyzer 502 may determine one or more attribute values for one or more frames, then analyze the attribute values over time to determine one or more of the temporal patterns. For example, FIG. 7 shows a graph 704 of attribute values 710 of an attribute over time. In at least one embodiment, the attribute values 710 may be computed by the data set analyzer 502 using equation (1):

$$\frac{\|P2 - P6\| + \|P3 - P5\|}{2\|P1 - P4\|} \quad (1)$$

The data set analyzer 502 may use the attribute values 710 to compute the blink rate 512A as the number of blinks per second, with frames 3 and 7 being examples of start and end times the data set analyzer 502 may identify for a blink from the attribute values 710. As another example, the data set analyzer 502 may use the attribute values 710 to compute the eye closed percentage 512B as the percentage of the frames 700 in which the attribute values 710 indicate a closed eye, such as the frame 700B. The data set analyzer 502 may use the attribute values 710 to compute the blink amplitude 512C based at least on a measured duration 720 of a blink. For example, the blink amplitude 512C may be computed using equation (2):

$$\frac{A\,\text{start} - 2A\,\text{bottom} + A\,\text{end}}{2}, \quad (2)$$

wherein Astart is an attribute value at a start of a blink, a bottom is an attribute value at a bottom of the blink, and Aend is an attribute value at an end of a blink.

The data set analyzer 502 may use the attribute values 710 to compute the eye velocity 512F based at least on a measured start, bottom, and end frame of a blink. For example, the eye velocity 512F may be computed using equation (3):

$$\frac{A\,\text{end} - A\,\text{bottom}}{\text{end} - \text{bottom}}. \quad (3)$$

Similar approaches may be used to determine other temporal patterns, such as using head pose for nodding patterns, mouth landmarks for yawn patterns, etc. While disclosed embodiments are primarily described in terms of samples corresponds to frames or images, disclosed approaches may be applied to other forms of samples and/or temporal sequences, such as audio samples, multimedia samples, and/or any form of sample which may be applied as an input to an MLM.

Referring now to FIG. 8, FIG. 8 is a flow diagram showing a method 800 for controllably generating one or more samples based at least on associating one or more temporal patterns with one or more temporal scenarios, in accordance with some embodiments of the present disclosure. The method 800, at block B802 includes associating one or more temporal patterns of one or more attributes with one or more temporal scenarios. For example, the data set analyzer 502 may analyze the reference data set 508 for a temporal scenario (and/or value thereof) to determine the temporal patterns 512 associated with the temporal scenario.

The method 800, at block B804 includes assigning values of the one or more attributes to a sequence of samples based at least on the one or more temporal attributes being associated with the one or more temporal scenarios. For example, the frame attribute determiner 504 may determine the frame attributes 516 for one or more sequences of frames using the temporal patterns 512 associated with the temporal scenario and assign the frame attributes 516 to each frame of the one or more sequences of frames.

The method 800, at block B806 includes generating, using one or more generative MLMs, the sequence of samples using the assigned values. For example, a generative MLM, such as the generative MLM 116, may be used to generate the one or more sequences of frames.

The method 800, at block B808 includes training at least one MLM using the sequence of samples. For example, the MLM 104 and/or another MLM may be trained using the one or more sequences of frames.

FIG. 9 is an illustration of an example process 900 that may be used for attribute controllable generation of one or more data sets, in accordance with some embodiments of the present disclosure. The process 900 provides a general approach that may be used for attribute controllable generation of one or more data sets. In various examples, the process 900 may be used to generate one or more samples of a generated data set 932 for augmentation, testing, training (initial training and/or retraining), and/or verification. For example, the process 900 includes input data 902 being provided to the data set determiner 112 to generate the control data 130, and the control data 130 being applied to the generative MLM 116 to produce the generated data set 932.

As indicated in FIG. 1, the process 900 may be included in the process 100, where the input data 902 includes the performance data 128, and the generated data set 932 includes the generated data set 132. Also as indicated in FIG. 5, the process 900 may be included in the process 500, where the input data 902 includes the reference data set 508 and/or the temporal patterns 512, and the generated data set 532 includes the generated data set 132. For example, the data set determiner 112 may include the data set analyzer 502 and/or the frame attribute determiner 504. While the process 500 includes temporal patterns, the process 500 may more generally involve the data set analyzer 502 analyzer the reference data set 508 to determine one or more characteristics of the reference data set (e.g., attribute distribution, attributes present, corner cases, etc.), which may or may not include the temporal patterns 512. Further, the frame attribute determiner 504 may more generally be used to determine one or more attributes of one or more samples based at least on the one or more characteristics.

As described herein, the input data 902 may include and/or indicate a set of attributes to be included in the generated data set 932. The performance data 128 is an example of the input data 902 indicating a set of attributes to be included in the generated data set 932. As a further examples, the input data 902 may include a list of attributes. For example, for compliance testing, a set of attributes is often provided that will be used for testing. In other examples, the input data 902 may include an underrepresented testing scenario (e.g., in a data set) such as a drowsiness level for a driver reaching KSS 9. Using disclosed approaches, the data set determiner 112 may determine the control data 130 to produce a generated data set 932 that includes the set of attributes. For example, the data set determiner 112 may use the generative MLM 116 to generate a data set according to a distribution of the attributes and/or combination of the attributes desired for a training, verification, and/or testing data set and/or an overall data set from which one or more of those data sets are formed. An example of such a distribution includes an even distribution of attributes and/or combinations of attributes. Using such an approach, the data sets may be customized to particular scenarios associated with the attributes.

Additionally or alternative, the data set determiner 112 may use the generative MLM 116 to produce the generated data set 932 and to define and/or alter the distribution of attributes and/or combinations of attributes in a data set used for augmentation, training, validation, and/or testing. By way of example and not limitation, at least 80% of the data may be reserved for training (e.g., 95%), and any remainder may be used for verification and/or testing (e.g., 5%). The verification and/or testing data set(s) may be augmented using a GNN to include additional one or more samples corresponding to underrepresented attributes and/or combinations thereof so as to include sufficient testing data for those scenarios.

In at least one embodiment, the input data 902 may include one or more samples, which may include, for example, one or more subjects of one or more classes (e.g., different faces, which may be randomly generated and/or may be from real-world data). The data set determiner 112 may for each subject, alter one or more attributes of the subject to produce a corresponding samples for the generate data set. For example, for a set of subjects and attributes, the data set determiner 112 may use the generative MLM 116 to produce for each subject, a sample for each possible combination of the attributes. The generated data set 932 may be used for augmentation, testing, training (initial training and/or retraining), and/or verification. For example, the MLM 104 may be initial trained using the subjects, then trained using the generated data set 932, or the MLM 104 may be initially trained using at least one or more samples from the generated data set 932.

Figure 10:
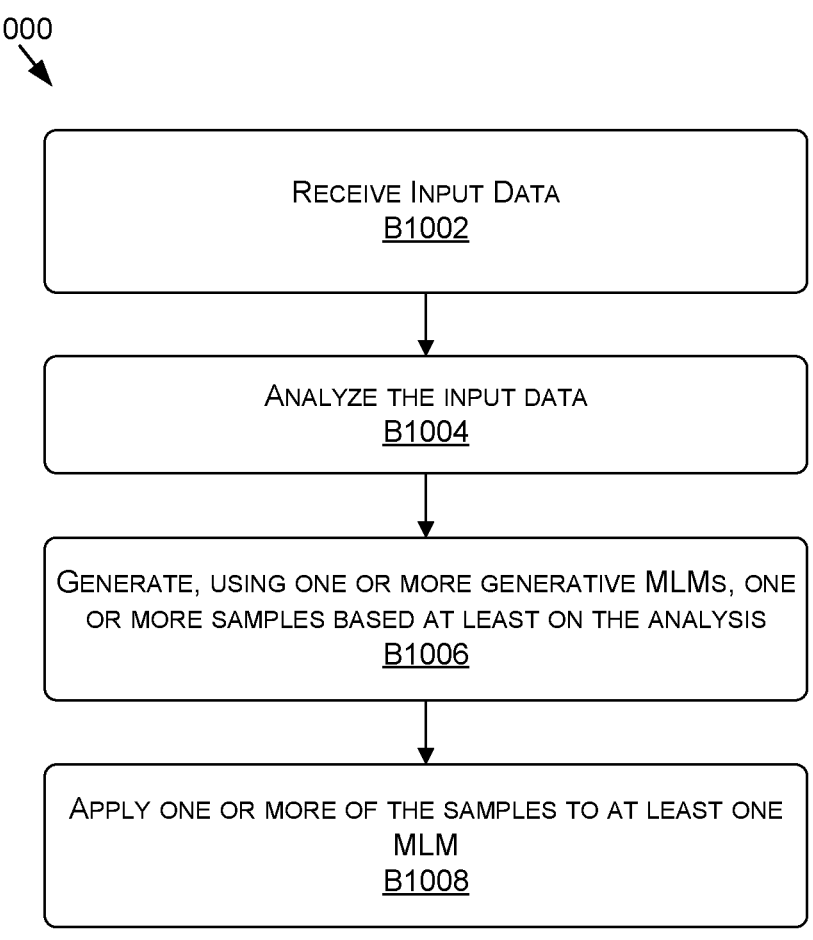
FIG. 10 is a flow diagram showing a method for controllably generating one or more samples based at least on analyzing input data, in accordance with some embodiments of the present disclosure.

Referring now to FIG. 10, FIG. 10 is a flow diagram showing a method 1000 for controllably generating one or more samples based at least on analyzing input data, in accordance with some embodiments of the present disclosure. The method 1000, at block B1002 includes receiving input data. For example, the data set determiner 112 may receive the input data 902. The method 1000, at block B1004 includes analyzing the input data. For example, the data set determiner 112 may analyze the input data 902. The method 1000, at block B1006 generating, using one or more generative MLMs, one or more samples based at least on the analysis. For example, the data set determiner 112 may generate one or more samples of the generated data set 932 using the generative MLM 116 based at least on the analysis. The method 1000, at block B1008 includes applying one or more of the samples to at least one MLM. For example, one or more of the samples may be applied to the MLM 104 for training, verification, and/or testing.

Example Autonomous Vehicle

Figure 11A:
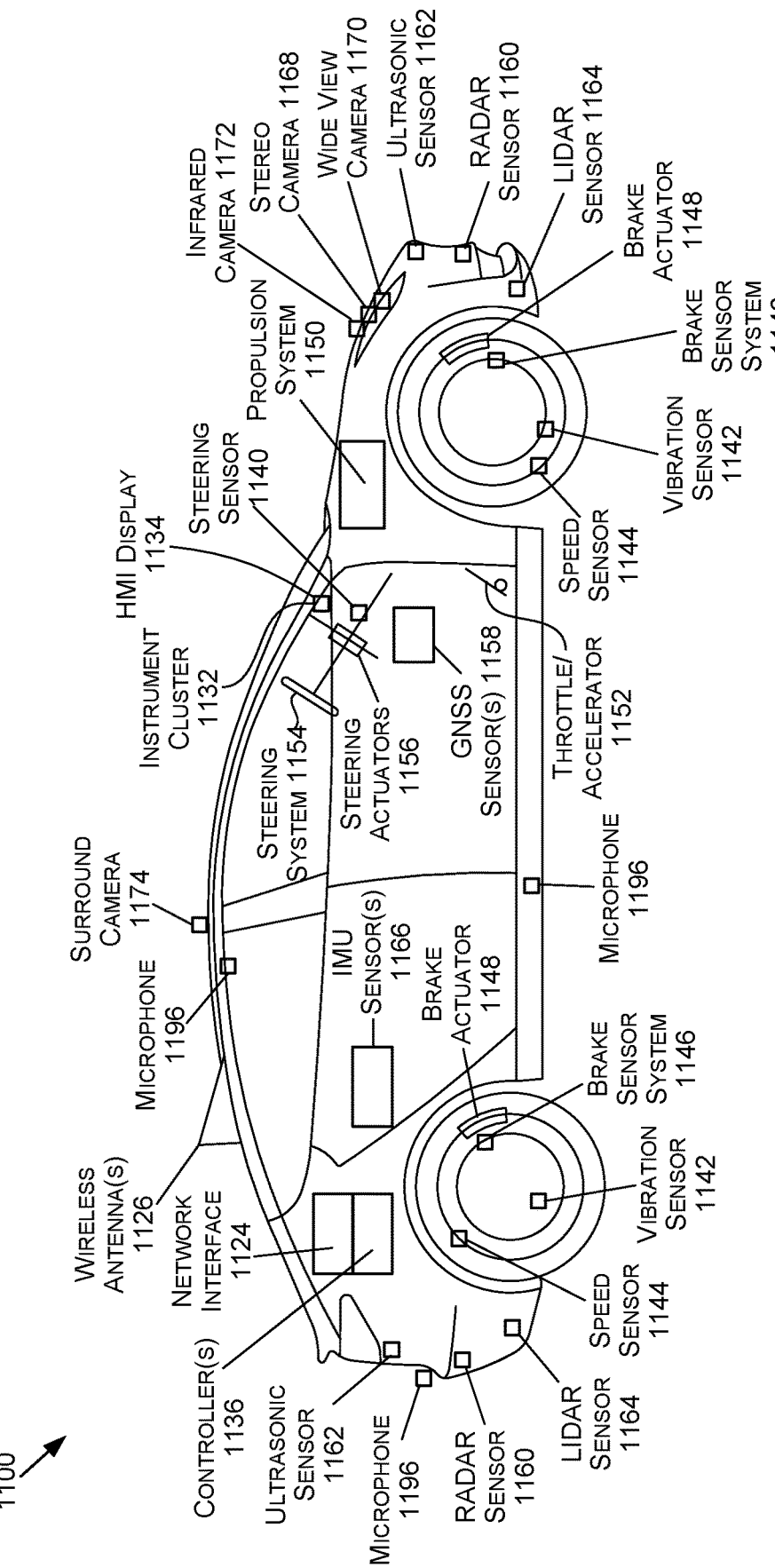
FIG. 11A is an illustration of an example autonomous vehicle, in accordance with some embodiments of the present disclosure.

FIG. 11A is an illustration of an example autonomous vehicle 1100, in accordance with some embodiments of the present disclosure. The autonomous vehicle 1100 (alternatively referred to herein as the "vehicle 1100") may include, without limitation, a passenger vehicle, such as a car, a truck, a bus, a first responder vehicle, a shuttle, an electric or motorized bicycle, a motorcycle, a fire truck, a police vehicle, an ambulance, a boat, a construction vehicle, an underwater craft, a drone, a vehicle coupled to a trailer, and/or another type of vehicle (e.g., that is unmanned and/or that accommodates one or more passengers). Autonomous vehicles are generally described in terms of automation levels, defined by the National Highway Traffic Safety Administration (NHTSA), a division of the US Department of Transportation, and the Society of Automotive Engineers (SAE) "Taxonomy and Definitions for Terms Related to Driving Automation Systems for On-Road Motor Vehicles" (Standard No. J3016-201806, published on Jun. 15, 2018, Standard No. J3016-201609, published on Sep. 30, 2016, and previous and future versions of this standard). The vehicle 1100 may be capable of functionality in accordance with one or more of Level 3-Level 5 of the autonomous driving levels. The vehicle 1100 may be capable of functionality in accordance with one or more of Level 1-Level 5 of the autonomous driving levels. For example, the vehicle 1100 may be capable of driver assistance (Level 1), partial automation (Level 2), conditional automation (Level 3), high automation (Level 4), and/or full automation (Level 5), depending on the embodiment. The term "autonomous," as used herein, may include any and/or all types of autonomy for the vehicle 1100 or other machine, such as being fully autonomous, being highly autonomous, being conditionally autonomous, being partially autonomous, providing assistive autonomy, being semi-autonomous, being primarily autonomous, or other designation.

The vehicle 1100 may include components such as a chassis, a vehicle body, wheels (e.g., 2, 4, 6, 8, 18, etc.), tires, axles, and other components of a vehicle. The vehicle 1100 may include a propulsion system 1150, such as an internal combustion engine, hybrid electric power plant, an all-electric engine, and/or another propulsion system type. The propulsion system 1150 may be connected to a drive train of the vehicle 1100, which may include a transmission, to enable the propulsion of the vehicle 1100. The propulsion system 1150 may be controlled in response to receiving signals from the throttle/accelerator 1152.

A steering system 1154, which may include a steering wheel, may be used to steer the vehicle 1100 (e.g., along a desired path or route) when the propulsion system 1150 is operating (e.g., when the vehicle is in motion). The steering system 1154 may receive signals from a steering actuator 1156. The steering wheel may be optional for full automation (Level 5) functionality.

The brake sensor system 1146 may be used to operate the vehicle brakes in response to receiving signals from the brake actuators 1148 and/or brake sensors.

Controller(s) 1136, which may include one or more system on chips (SoCs) 1104 (FIG. 11C) and/or GPU(s), may provide signals (e.g., representative of commands) to one or more components and/or systems of the vehicle 1100. For example, the controller(s) may send signals to operate the vehicle brakes via one or more brake actuators 1148, to operate the steering system 1154 via one or more steering actuators 1156, to operate the propulsion system 1150 via one or more throttle/accelerators 1152. The controller(s) 1136 may include one or more onboard (e.g., integrated) computing devices (e.g., supercomputers) that process sensor signals, and output operation commands (e.g., signals representing commands) to enable autonomous driving and/ or to assist a human driver in driving the vehicle 1100. The controller(s) 1136 may include a first controller 1136 for autonomous driving functions, a second controller 1136 for functional safety functions, a third controller 1136 for artificial intelligence functionality (e.g., computer vision), a fourth controller 1136 for infotainment functionality, a fifth controller 1136 for redundancy in emergency conditions, and/or other controllers. In some examples, a single controller 1136 may handle two or more of the above functionalities, two or more controllers 1136 may handle a single functionality, and/or any combination thereof.

The controller(s) 1136 may provide the signals for controlling one or more components and/or systems of the vehicle 1100 in response to sensor data received from one or more sensors (e.g., sensor inputs). The sensor data may be received from, for example and without limitation, global navigation satellite systems sensor(s) 1158 (e.g., Global Positioning System sensor(s)), RADAR sensor(s) 1160, ultrasonic sensor(s) 1162, LIDAR sensor(s) 1164, inertial measurement unit (IMU) sensor(s) 1166 (e.g., accelerometer(s), gyroscope(s), magnetic compass(es), magnetometer(s), etc.), microphone(s) 1196, stereo camera(s) 1168, wide-view camera(s) 1170 (e.g., fisheye cameras), infrared camera(s) 1172, surround camera(s) 1174 (e.g., 360 degree cameras), long-range and/or mid-range camera(s) 1198, speed sensor(s) 1144 (e.g., for measuring the speed of the vehicle 1100), vibration sensor(s) 1142, steering sensor(s) 1140, brake sensor(s) (e.g., as part of the brake sensor system 1146), and/or other sensor types.

One or more of the controller(s) 1136 may receive inputs (e.g., represented by input data) from an instrument cluster 1132 of the vehicle 1100 and provide outputs (e.g., represented by output data, display data, etc.) via a human-machine interface (HMI) display 1134, an audible annunciator, a loudspeaker, and/or via other components of the vehicle 1100. The outputs may include information such as vehicle velocity, speed, time, map data (e.g., the HD map 1122 of FIG. 11C), location data (e.g., the vehicle's 1100 location, such as on a map), direction, location of other vehicles (e.g., an occupancy grid), information about objects and status of objects as perceived by the controller(s) 1136, etc. For example, the HMI display 1134 may display information about the presence of one or more objects (e.g., a street sign, caution sign, traffic light changing, etc.), and/or information about driving maneuvers the vehicle has made, is making, or will make (e.g., changing lanes now, taking exit 34B in two miles, etc.).

The vehicle 1100 further includes a network interface 1124 which may use one or more wireless antenna(s) 1126 and/or modem(s) to communicate over one or more networks. For example, the network interface 1124 may be capable of communication over LTE, WCDMA, UMTS, GSM, CDMA2000, etc. The wireless antenna(s) 1126 may also enable communication between objects in the environment (e.g., vehicles, mobile devices, etc.), using local area network(s), such as Bluetooth, Bluetooth LE, Z-Wave, Zig- Bee, etc., and/or low power wide-area network(s) (LP-WANs), such as LoRaWAN, SigFox, etc.

Figure 11B:
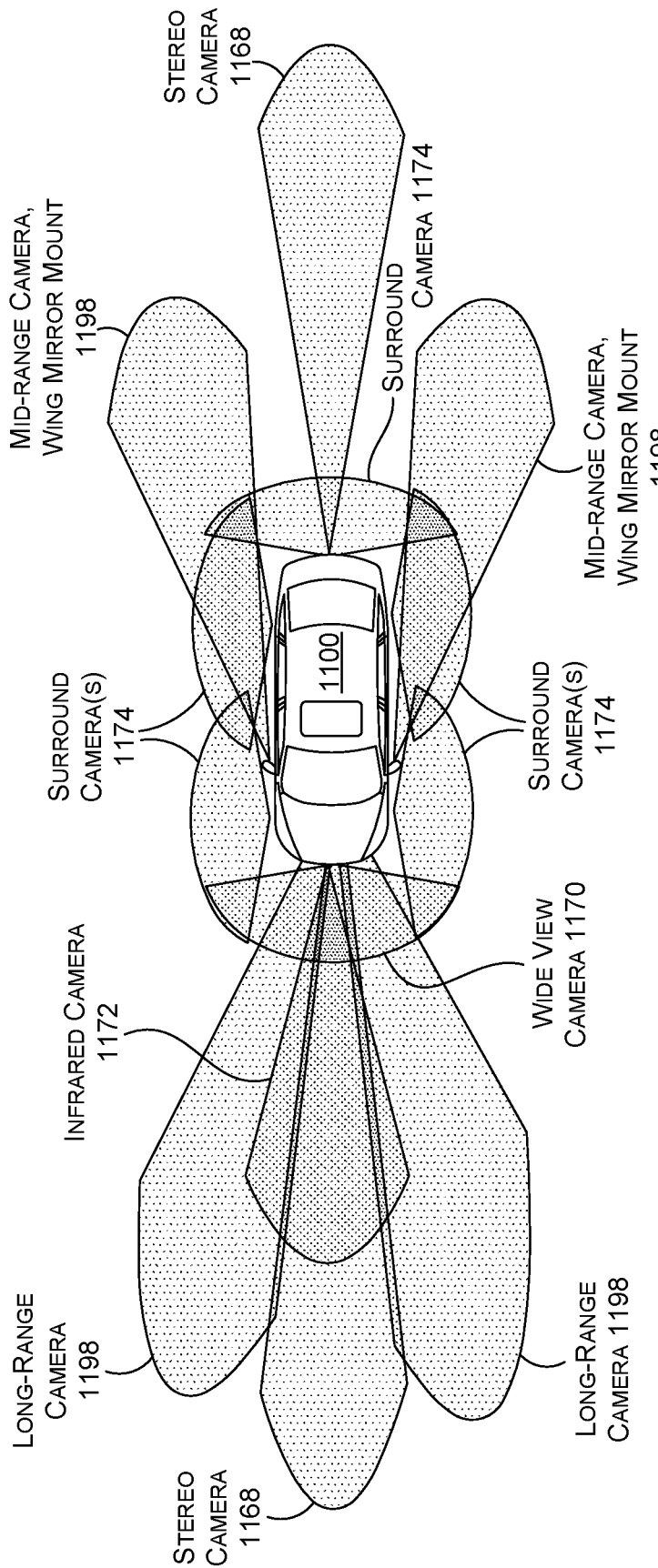
FIG. 11B is an example of camera locations and fields of view for the example autonomous vehicle of FIG. 11A, in accordance with some embodiments of the present disclosure.

FIG. 11B is an example of camera locations and fields of view for the example autonomous vehicle 1100 of FIG. 11A, in accordance with some embodiments of the present disclosure. The cameras and respective fields of view are one example embodiment and are not intended to be limiting. For example, additional and/or alternative cameras may be included and/or the cameras may be located at different locations on the vehicle 1100.

The camera types for the cameras may include, but are not limited to, digital cameras that may be adapted for use with the components and/or systems of the vehicle 1100. The camera(s) may operate at automotive safety integrity level (ASIL) B and/or at another ASIL. The camera types may be capable of any image capture rate, such as 60 frames per second (fps), 120 fps, 240 fps, etc., depending on the embodiment. The cameras may be capable of using rolling shutters, global shutters, another type of shutter, or a combination thereof. In some examples, the color filter array may include a red clear clear clear (RCCC) color filter array, a red clear clear blue (RCCB) color filter array, a red blue green clear (RBGC) color filter array, a Foveon X3 color filter array, a Bayer sensors (RGGB) color filter array, a monochrome sensor color filter array, and/or another type of color filter array. In some embodiments, clear pixel cameras, such as cameras with an RCCC, an RCCB, and/or an RBGC color filter array, may be used in an effort to increase light sensitivity.

In some examples, one or more of the camera(s) may be used to perform advanced driver assistance systems (ADAS) functions (e.g., as part of a redundant or fail-safe design). For example, a Multi-Function Mono Camera may be installed to provide functions including lane departure warning, traffic sign assist and intelligent headlamp control. One or more of the camera(s) (e.g., all of the cameras) may record and provide image data (e.g., video) simultaneously.

One or more of the cameras may be mounted in a mounting assembly, such as a custom designed (3-D printed) assembly, in order to cut out stray light and reflections from within the car (e.g., reflections from the dashboard reflected in the windshield mirrors) which may interfere with the camera's image data capture abilities. With reference to wing-mirror mounting assemblies, the wing-mirror assemblies may be custom 3-D printed so that the camera mounting plate matches the shape of the wing-mirror. In some examples, the camera(s) may be integrated into the wing-mirror. For side-view cameras, the camera(s) may also be integrated within the four pillars at each corner of the cabin.

Cameras with a field of view that include portions of the environment in front of the vehicle 1100 (e.g., front-facing cameras) may be used for surround view, to help identify forward facing paths and obstacles, as well aid in, with the help of one or more controllers 1136 and/or control SoCs, providing information critical to generating an occupancy grid and/or determining the preferred vehicle paths. Front-facing cameras may be used to perform many of the same ADAS functions as LIDAR, including emergency braking, pedestrian detection, and collision avoidance. Front-facing cameras may also be used for ADAS functions and systems including Lane Departure Warnings (LDW), Autonomous Cruise Control (ACC), and/or other functions such as traffic sign recognition.

A variety of cameras may be used in a front-facing configuration, including, for example, a monocular camera platform that includes a CMOS (complementary metal oxide semiconductor) color imager. Another example may be a wide-view camera(s) 1170 that may be used to perceive objects coming into view from the periphery (e.g., pedestrians, crossing traffic or bicycles). Although only one wide-view camera is illustrated in FIG. 11B, there may any number of wide-view cameras 1170 on the vehicle 1100. In addition, long-range camera(s) 1198 (e.g., a long-view stereo camera pair) may be used for depth-based object detection, especially for objects for which a neural network has not yet been trained. The long-range camera(s) 1198 may also be used for object detection and classification, as well as basic object tracking.

One or more stereo cameras 1168 may also be included in a front-facing configuration. The stereo camera(s) 1168 may include an integrated control unit comprising a scalable processing unit, which may provide a programmable logic (FPGA) and a multi-core micro-processor with an integrated CAN or Ethernet interface on a single chip. Such a unit may be used to generate a 3-D map of the vehicle's environment, including a distance estimate for all the points in the image. An alternative stereo camera(s) 1168 may include a compact stereo vision sensor(s) that may include two camera lenses (one each on the left and right) and an image processing chip that may measure the distance from the vehicle to the target object and use the generated information (e.g., metadata) to activate the autonomous emergency braking and lane departure warning functions. Other types of stereo camera(s) 1168 may be used in addition to, or alternatively from, those described herein.

Cameras with a field of view that include portions of the environment to the side of the vehicle 1100 (e.g., side-view cameras) may be used for surround view, providing information used to create and update the occupancy grid, as well as to generate side impact collision warnings. For example, surround camera(s) 1174 (e.g., four surround cameras 1174 as illustrated in FIG. 11B) may be positioned to on the vehicle 1100. The surround camera(s) 1174 may include wide-view camera(s) 1170, fisheye camera(s), 360 degree camera(s), and/or the like. Four example, four fisheye cameras may be positioned on the vehicle's front, rear, and sides. In an alternative arrangement, the vehicle may use three surround camera(s) 1174 (e.g., left, right, and rear), and may leverage one or more other camera(s) (e.g., a forward-facing camera) as a fourth surround view camera.

Cameras with a field of view that include portions of the environment to the rear of the vehicle 1100 (e.g., rear-view cameras) may be used for park assistance, surround view, rear collision warnings, and creating and updating the occupancy grid. A wide variety of cameras may be used including, but not limited to, cameras that are also suitable as a front-facing camera(s) (e.g., long-range and/or mid-range camera(s) 1198, stereo camera(s) 1168), infrared camera(s) 1172, etc.), as described herein.

Figure 11C:
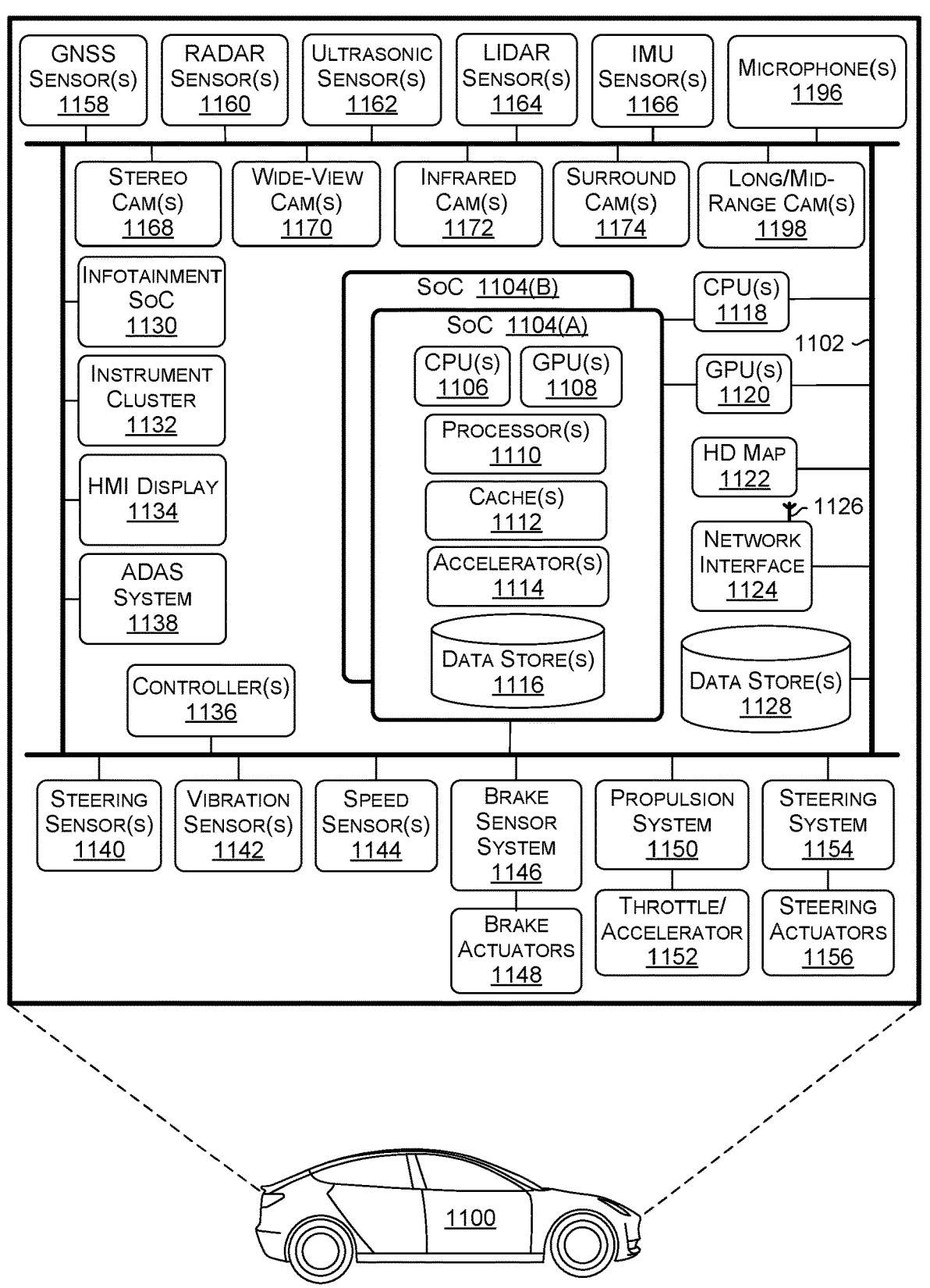
FIG. 11C is a block diagram of an example system architecture for the example autonomous vehicle of FIG. 11A, in accordance with some embodiments of the present disclosure.

FIG. 11C is a block diagram of an example system architecture for the example autonomous vehicle 1100 of FIG. 11A, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory.

Each of the components, features, and systems of the vehicle 1100 in FIG. 11C are illustrated as being connected via bus 1102. The bus 1102 may include a Controller Area Network (CAN) data interface (alternatively referred to herein as a "CAN bus"). A CAN may be a network inside the vehicle 1100 used to aid in control of various features and functionality of the vehicle 1100, such as actuation of brakes, acceleration, braking, steering, windshield wipers, etc. A CAN bus may be configured to have dozens or even hundreds of nodes, each with its own unique identifier (e.g., a CAN ID). The CAN bus may be read to find steering wheel angle, ground speed, engine revolutions per minute (RPMs), button positions, and/or other vehicle status indicators. The CAN bus may be ASIL B compliant.

Although the bus 1102 is described herein as being a CAN bus, this is not intended to be limiting. For example, in addition to, or alternatively from, the CAN bus, FlexRay and/or Ethernet may be used. Additionally, although a single line is used to represent the bus 1102, this is not intended to be limiting. For example, there may be any number of busses 1102, which may include one or more CAN busses, one or more FlexRay busses, one or more Ethernet busses, and/or one or more other types of busses using a different protocol. In some examples, two or more busses 1102 may be used to perform different functions, and/or may be used for redundancy. For example, a first bus 1102 may be used for collision avoidance functionality and a second bus 1102 may be used for actuation control. In any example, each bus 1102 may communicate with any of the components of the vehicle 1100, and two or more busses 1102 may communicate with the same components. In some examples, each SoC 1104, each controller 1136, and/or each computer within the vehicle may have access to the same input data (e.g., inputs from sensors of the vehicle 1100), and may be connected to a common bus, such the CAN bus.

The vehicle 1100 may include one or more controller(s) 1136, such as those described herein with respect to FIG. 11A. The controller(s) 1136 may be used for a variety of functions. The controller(s) 1136 may be coupled to any of the various other components and systems of the vehicle 1100, and may be used for control of the vehicle 1100, artificial intelligence of the vehicle 1100, infotainment for the vehicle 1100, and/or the like.

The vehicle 1100 may include a system(s) on a chip (SoC) 1104. The SoC 1104 may include CPU(s) 1106, GPU(s) 1108, processor(s) 1110, cache(s) 1112, accelerator(s) 1114, data store(s) 1116, and/or other components and features not illustrated. The SoC(s) 1104 may be used to control the vehicle 1100 in a variety of platforms and systems. For example, the SoC(s) 1104 may be combined in a system (e.g., the system of the vehicle 1100) with an HD map 1122 which may obtain map refreshes and/or updates via a network interface 1124 from one or more servers (e.g., server(s) 1178 of FIG. 11D).

The CPU(s) 1106 may include a CPU cluster or CPU complex (alternatively referred to herein as a "CCPLEX"). The CPU(s) 1106 may include multiple cores and/or L2 caches. For example, in some embodiments, the CPU(s) 1106 may include eight cores in a coherent multi-processor configuration. In some embodiments, the CPU(s) 1106 may include four dual-core clusters where each cluster has a dedicated L2 cache (e.g., a 2 MB L2 cache). The CPU(s) 1106 (e.g., the CCPLEX) may be configured to support simultaneous cluster operation enabling any combination of the clusters of the CPU(s) 1106 to be active at any given time.

The CPU(s) 1106 may implement power management capabilities that include one or more of the following features: individual hardware blocks may be clock-gated automatically when idle to save dynamic power; each core clock may be gated when the core is not actively executing instructions due to execution of WFI/WFE instructions; each core may be independently power-gated; each core cluster may be independently clock-gated when all cores are clock-gated or power-gated; and/or each core cluster may be independently power-gated when all cores are power-gated. The CPU(s) 1106 may further implement an enhanced algorithm for managing power states, where allowed power states and expected wakeup times are specified, and the hardware/microcode determines the best power state to enter for the core, cluster, and CCPLEX. The processing cores may support simplified power state entry sequences in software with the work offloaded to microcode.

The GPU(s) 1108 may include an integrated GPU (alternatively referred to herein as an "iGPU"). The GPU(s) 1108 may be programmable and may be efficient for parallel workloads. The GPU(s) 1108, in some examples, may use an enhanced tensor instruction set. The GPU(s) 1108 may include one or more streaming microprocessors, where each streaming microprocessor may include an L1 cache (e.g., an L1 cache with at least 96K B storage capacity), and two or more of the streaming microprocessors may share an L2 cache (e.g., an L2 cache with a 512 KB storage capacity). In some embodiments, the GPU(s) 1108 may include at least eight streaming microprocessors. The GPU(s) 1108 may use compute application programming interface(s) (API(s)). In addition, the GPU(s) 1108 may use one or more parallel computing platforms and/or programming models (e.g., NVIDIA's CUDA).

The GPU(s) 1108 may be power-optimized for best performance in automotive and embedded use cases. For example, the GPU(s) 1108 may be fabricated on a Fin field-effect transistor (FinFET). However, this is not intended to be limiting and the GPU(s) 1108 may be fabricated using other semiconductor manufacturing processes. Each streaming microprocessor may incorporate a number of mixed-precision processing cores partitioned into multiple blocks. For example, and without limitation, 64 PF32 cores and 32 PF64 cores may be partitioned into four processing blocks. In such an example, each processing block may be allocated 16 FP32 cores, 8 FP64 cores, 16 INT32 cores, two mixed-precision NVIDIA TENSOR COREs for deep learning matrix arithmetic, an L0 instruction cache, a warp scheduler, a dispatch unit, and/or a 64 KB register file. In addition, the streaming microprocessors may include independent parallel integer and floating-point data paths to provide for efficient execution of workloads with a mix of computation and addressing calculations. The streaming microprocessors may include independent thread scheduling capability to enable finer-grain synchronization and cooperation between parallel threads. The streaming microprocessors may include a combined L1 data cache and shared memory unit in order to improve performance while simplifying programming.

The GPU(s) 1108 may include a high bandwidth memory (HBM) and/or a 16 GB HBM2 memory subsystem to provide, in some examples, about 900 GB/second peak memory bandwidth. In some examples, in addition to, or alternatively from, the HBM memory, a synchronous graph-ics random-access memory (SGRAM) may be used, such as a graphics double data rate type five synchronous random-access memory (GDDR5).

The GPU(s) 1108 may include unified memory technology including access counters to allow for more accurate migration of memory pages to the processor that accesses them most frequently, thereby improving efficiency for memory ranges shared between processors. In some examples, address translation services (ATS) support may be used to allow the GPU(s) 1108 to access the CPU(s) 1106 page tables directly. In such examples, when the GPU(s) 1108 memory management unit (MMU) experiences a miss, an address translation request may be transmitted to the CPU(s) 1106. In response, the CPU(s) 1106 may look in its page tables for the virtual-to-physical mapping for the address and transmits the translation back to the GPU(s) 1108. As such, unified memory technology may allow a single unified virtual address space for memory of both the CPU(s) 1106 and the GPU(s) 1108, thereby simplifying the GPU(s) 1108 programming and porting of applications to the GPU(s) 1108.

In addition, the GPU(s) 1108 may include an access counter that may keep track of the frequency of access of the GPU(s) 1108 to memory of other processors. The access counter may help ensure that memory pages are moved to the physical memory of the processor that is accessing the pages most frequently.

The SoC(s) 1104 may include any number of cache(s) 1112, including those described herein. For example, the cache(s) 1112 may include an L3 cache that is available to both the CPU(s) 1106 and the GPU(s) 1108 (e.g., that is connected both the CPU(s) 1106 and the GPU(s) 1108). The cache(s) 1112 may include a write-back cache that may keep track of states of lines, such as by using a cache coherence protocol (e.g., MEI, MESI, MSI, etc.). The L3 cache may include 4 MB or more, depending on the embodiment, although smaller cache sizes may be used.

The SoC(s) 1104 may include an arithmetic logic unit(s) (ALU(s)) which may be leveraged in performing processing with respect to any of the variety of tasks or operations of the vehicle 1100—such as processing DNNs. In addition, the SoC(s) 1104 may include a floating point unit(s) (FPU(s))—or other math coprocessor or numeric coprocessor types—for performing mathematical operations within the system. For example, the SoC(s) 104 may include one or more FPUs integrated as execution units within a CPU(s) 1106 and/or GPU(s) 1108.

The SoC(s) 1104 may include one or more accelerators 1114 (e.g., hardware accelerators, software accelerators, or a combination thereof). For example, the SoC(s) 1104 may include a hardware acceleration cluster that may include optimized hardware accelerators and/or large on-chip memory. The large on-chip memory (e.g., 4 MB of SRAM), may enable the hardware acceleration cluster to accelerate neural networks and other calculations. The hardware acceleration cluster may be used to complement the GPU(s) 1108 and to off-load some of the tasks of the GPU(s) 1108 (e.g., to free up more cycles of the GPU(s) 1108 for performing other tasks). As an example, the accelerator(s) 1114 may be used for targeted workloads (e.g., perception, convolutional neural networks (CNNs), etc.) that are stable enough to be amenable to acceleration. The term "CNN," as used herein, may include all types of CNNs, including region-based or regional convolutional neural networks (RCNNs) and Fast RCNNs (e.g., as used for object detection).

The accelerator(s) 1114 (e.g., the hardware acceleration cluster) may include a deep learning accelerator(s) (DLA).

The DLA(s) may include one or more Tensor processing units (TPUs) that may be configured to provide an additional ten trillion operations per second for deep learning applications and inferencing. The TPUs may be accelerators configured to, and optimized for, performing image processing functions (e.g., for CNNs, RCNNs, etc.). The DLA(s) may further be optimized for a specific set of neural network types and floating point operations, as well as inferencing. The design of the DLA(s) may provide more performance per millimeter than a general-purpose GPU, and vastly exceeds the performance of a CPU. The TPU(s) may perform several functions, including a single-instance convolution function, supporting, for example, INT8, INT16, and FP16 data types for both features and weights, as well as post-processor functions.

The DLA(s) may quickly and efficiently execute neural networks, especially CNNs, on processed or unprocessed data for any of a variety of functions, including, for example and without limitation: a CNN for object identification and detection using data from camera sensors; a CNN for distance estimation using data from camera sensors; a CNN for emergency vehicle detection and identification and detection using data from microphones; a CNN for facial recognition and vehicle owner identification using data from camera sensors; and/or a CNN for security and/or safety related events.

The DLA(s) may perform any function of the GPU(s) 1108, and by using an inference accelerator, for example, a designer may target either the DLA(s) or the GPU(s) 1108 for any function. For example, the designer may focus processing of CNNs and floating point operations on the DLA(s) and leave other functions to the GPU(s) 1108 and/or other accelerator(s) 1114.

The accelerator(s) 1114 (e.g., the hardware acceleration cluster) may include a programmable vision accelerator(s) (PVA), which may alternatively be referred to herein as a computer vision accelerator. The PVA(s) may be designed and configured to accelerate computer vision algorithms for the advanced driver assistance systems (ADAS), autonomous driving, and/or augmented reality (AR) and/or virtual reality (VR) applications. The PVA(s) may provide a balance between performance and flexibility. For example, each PVA(s) may include, for example and without limitation, any number of reduced instruction set computer (RISC) cores, direct memory access (DMA), and/or any number of vector processors.

The RISC cores may interact with image sensors (e.g., the image sensors of any of the cameras described herein), image signal processor(s), and/or the like. Each of the RISC cores may include any amount of memory. The RISC cores may use any of a number of protocols, depending on the embodiment. In some examples, the RISC cores may execute a real-time operating system (RTOS). The RISC cores may be implemented using one or more integrated circuit devices, application specific integrated circuits (ASICs), and/or memory devices. For example, the RISC cores may include an instruction cache and/or a tightly coupled RAM.

The DMA may enable components of the PVA(s) to access the system memory independently of the CPU(s) 1106. The DMA may support any number of features used to provide optimization to the PVA including, but not limited to, supporting multi-dimensional addressing and/or circular addressing. In some examples, the DMA may support up to six or more dimensions of addressing, which may include block width, block height, block depth, horizontal block stepping, vertical block stepping, and/or depth stepping.

The vector processors may be programmable processors that may be designed to efficiently and flexibly execute programming for computer vision algorithms and provide signal processing capabilities. In some examples, the PVA may include a PVA core and two vector processing subsystem partitions. The PVA core may include a processor subsystem, DMA engine(s) (e.g., two DMA engines), and/or other peripherals. The vector processing subsystem may operate as the primary processing engine of the PVA, and may include a vector processing unit (VPU), an instruction cache, and/or vector memory (e.g., VMEM). A VPU core may include a digital signal processor such as, for example, a single instruction, multiple data (SIMM), very long instruction word (VLIW) digital signal processor. The combination of the SIMD and VLIW may enhance throughput and speed.

Each of the vector processors may include an instruction cache and may be coupled to dedicated memory. As a result, in some examples, each of the vector processors may be configured to execute independently of the other vector processors. In other examples, the vector processors that are included in a particular PVA may be configured to employ data parallelism. For example, in some embodiments, the plurality of vector processors included in a single PVA may execute the same computer vision algorithm, but on different regions of an image. In other examples, the vector processors included in a particular PVA may simultaneously execute different computer vision algorithms, on the same image, or even execute different algorithms on sequential images or portions of an image. Among other things, any number of PVAs may be included in the hardware acceleration cluster and any number of vector processors may be included in each of the PVAs. In addition, the PVA(s) may include additional error correcting code (ECC) memory, to enhance overall system safety.

The accelerator(s) 1114 (e.g., the hardware acceleration cluster) may include a computer vision network on-chip and SRAM, for providing a high-bandwidth, low latency SRAM for the accelerator(s) 1114. In some examples, the on-chip memory may include at least 4 MB SRAM, consisting of, for example and without limitation, eight field-configurable memory blocks, that may be accessible by both the PVA and the DLA. Each pair of memory blocks may include an advanced peripheral bus (APB) interface, configuration circuitry, a controller, and a multiplexer. Any type of memory may be used. The PVA and DLA may access the memory via a backbone that provides the PVA and DLA with high-speed access to memory. The backbone may include a computer vision network on-chip that interconnects the PVA and the DLA to the memory (e.g., using the APB).

The computer vision network on-chip may include an interface that determines, before transmission of any control signal/address/data, that both the PVA and the DLA provide ready and valid signals. Such an interface may provide for separate phases and separate channels for transmitting control signals/addresses/data, as well as burst-type communications for continuous data transfer. This type of interface may comply with ISO 26262 or IEC 61508 standards, although other standards and protocols may be used.

In some examples, the SoC(s) 1104 may include a real-time ray-tracing hardware accelerator, such as described in U.S. patent application Ser. No. 16/101,232, filed on Aug. 10, 2018. The real-time ray-tracing hardware accelerator may be used to quickly and efficiently determine the positions and extents of objects (e.g., within a world model), to generate real-time visualization simulations, for RADAR signal interpretation, for sound propagation synthesis and/or analysis, for simulation of SONAR systems, for general wave propagation simulation, for comparison to LIDAR data for purposes of localization and/or other functions, and/or for other uses. In some embodiments, one or more tree traversal units (TTUs) may be used for executing one or more ray-tracing related operations.

The accelerator(s) 1114 (e.g., the hardware accelerator cluster) have a wide array of uses for autonomous driving. The PVA may be a programmable vision accelerator that may be used for key processing stages in ADAS and autonomous vehicles. The PVA's capabilities are a good match for algorithmic domains needing predictable processing, at low power and low latency. In other words, the PVA performs well on semi-dense or dense regular computation, even on small data sets, which need predictable run-times with low latency and low power. Thus, in the context of platforms for autonomous vehicles, the PVAs are designed to run classic computer vision algorithms, as they are efficient at object detection and operating on integer math.

For example, according to one embodiment of the technology, the PVA is used to perform computer stereo vision. A semi-global matching-based algorithm may be used in some examples, although this is not intended to be limiting. Many applications for Level 3-5 autonomous driving require motion estimation/stereo matching on-the-fly (e.g., structure from motion, pedestrian recognition, lane detection, etc.). The PVA may perform computer stereo vision function on inputs from two monocular cameras.

In some examples, the PVA may be used to perform dense optical flow. According to process raw RADAR data (e.g., using a 4D Fast Fourier Transform) to provide Processed RADAR. In other examples, the PVA is used for time of flight depth processing, by processing raw time of flight data to provide processed time of flight data, for example.

The DLA may be used to run any type of network to enhance control and driving safety, including for example, a neural network that outputs a measure of confidence for each object detection. Such a confidence value may be interpreted as a probability, or as providing a relative "weight" of each detection compared to other detections. This confidence value enables the system to make further decisions regarding which detections should be considered as true positive detections rather than false positive detections. For example, the system may set a threshold value for the confidence and consider only the detections exceeding the threshold value as true positive detections. In an automatic emergency braking (AEB) system, false positive detections would cause the vehicle to automatically perform emergency braking, which is obviously undesirable. Therefore, only the most confident detections should be considered as triggers for AEB. The DLA may run a neural network for regressing the confidence value. The neural network may take as its input at least some subset of parameters, such as bounding box dimensions, ground plane estimate obtained (e.g. from another subsystem), inertial measurement unit (IMU) sensor 1166 output that correlates with the vehicle 1100 orientation, distance, 3D location estimates of the object obtained from the neural network and/or other sensors (e.g., LIDAR sensor(s) 1164 or RADAR sensor(s) 1160), among others.

The SoC(s) 1104 may include data store(s) 1116 (e.g., memory). The data store(s) 1116 may be on-chip memory of the SoC(s) 1104, which may store neural networks to be executed on the GPU and/or the DLA. In some examples, the data store(s) 1116 may be large enough in capacity to store multiple instances of neural networks for redundancy and safety. The data store(s) 1112 may comprise L2 or L3 cache(s) 1112. Reference to the data store(s) 1116 may include reference to the memory associated with the PVA, DLA, and/or other accelerator(s) 1114, as described herein.

The SoC(s) 1104 may include one or more processor(s) 1110 (e.g., embedded processors). The processor(s) 1110 may include a boot and power management processor that may be a dedicated processor and subsystem to handle boot power and management functions and related security enforcement. The boot and power management processor may be a part of the SoC(s) 1104 boot sequence and may provide runtime power management services. The boot power and management processor may provide clock and voltage programming, assistance in system low power state transitions, management of SoC(s) 1104 thermals and temperature sensors, and/or management of the SoC(s) 1104 power states. Each temperature sensor may be implemented as a ring-oscillator whose output frequency is proportional to temperature, and the SoC(s) 1104 may use the ring-oscillators to detect temperatures of the CPU(s) 1106, GPU(s) 1108, and/or accelerator(s) 1114. If temperatures are determined to exceed a threshold, the boot and power management processor may enter a temperature fault routine and put the SoC(s) 1104 into a lower power state and/or put the vehicle 1100 into a chauffeur to safe stop mode (e.g., bring the vehicle 1100 to a safe stop).

The processor(s) 1110 may further include a set of embedded processors that may serve as an audio processing engine. The audio processing engine may be an audio subsystem that enables full hardware support for multi-channel audio over multiple interfaces, and a broad and flexible range of audio I/O interfaces. In some examples, the audio processing engine is a dedicated processor core with a digital signal processor with dedicated RAM.

The processor(s) 1110 may further include an always on processor engine that may provide necessary hardware features to support low power sensor management and wake use cases. The always on processor engine may include a processor core, a tightly coupled RAM, supporting peripherals (e.g., timers and interrupt controllers), various I/O controller peripherals, and routing logic.

The processor(s) 1110 may further include a safety cluster engine that includes a dedicated processor subsystem to handle safety management for automotive applications. The safety cluster engine may include two or more processor cores, a tightly coupled RAM, support peripherals (e.g., timers, an interrupt controller, etc.), and/or routing logic. In a safety mode, the two or more cores may operate in a lockstep mode and function as a single core with comparison logic to detect any differences between their operations.

The processor(s) 1110 may further include a real-time camera engine that may include a dedicated processor subsystem for handling real-time camera management.

The processor(s) 1110 may further include a high-dynamic range signal processor that may include an image signal processor that is a hardware engine that is part of the camera processing pipeline.

The processor(s) 1110 may include a video image compositor that may be a processing block (e.g., implemented on a microprocessor) that implements video post-processing functions needed by a video playback application to produce the final image for the player window. The video image compositor may perform lens distortion correction on wide-view camera(s) 1170, surround camera(s) 1174, and/or on in-cabin monitoring camera sensors. In-cabin monitoring camera sensor is preferably monitored by a neural network running on another instance of the Advanced SoC, configured to identify in cabin events and respond accordingly. An in-cabin system may perform lip reading to activate cellular service and place a phone call, dictate emails, change the vehicle's destination, activate or change the vehicle's info-tainment system and settings, or provide voice-activated web surfing. Certain functions are available to the driver only when the vehicle is operating in an autonomous mode, and are disabled otherwise.

The video image compositor may include enhanced tem-poral noise reduction for both spatial and temporal noise reduction. For example, where motion occurs in a video, the noise reduction weights spatial information appropriately, decreasing the weight of information provided by adjacent frames. Where an image or portion of an image does not include motion, the temporal noise reduction performed by the video image compositor may use information from the previous image to reduce noise in the current image.

The video image compositor may also be configured to perform stereo rectification on input stereo lens frames. The video image compositor may further be used for user interface composition when the operating system desktop is in use, and the GPU(s) 1108 is not required to continuously render new surfaces. Even when the GPU(s) 1108 is pow-ered on and active doing 3D rendering, the video image compositor may be used to offload the GPU(s) 1108 to improve performance and responsiveness.

The SoC(s) 1104 may further include a mobile industry processor interface (MIPI) camera serial interface for receiv-ing video and input from cameras, a high-speed interface, and/or a video input block that may be used for camera and related pixel input functions. The SoC(s) 1104 may further include an input/output controller(s) that may be controlled by software and may be used for receiving I/O signals that are uncommitted to a specific role.

The SoC(s) 1104 may further include a broad range of peripheral interfaces to enable communication with periph-erals, audio codecs, power management, and/or other devices. The SoC(s) 1104 may be used to process data from cameras (e.g., connected over Gigabit Multimedia Serial Link and Ethernet), sensors (e.g., LIDAR sensor(s) 1164, RADAR sensor(s) 1160, etc. that may be connected over Ethernet), data from bus 1102 (e.g., speed of vehicle 1100, steering wheel position, etc.), data from GNSS sensor(s) 1158 (e.g., connected over Ethernet or CAN bus). The SoC(s) 1104 may further include dedicated high-perfor-mance mass storage controllers that may include their own DMA engines, and that may be used to free the CPU(s) 1106 from routine data management tasks.

The SoC(s) 1104 may be an end-to-end platform with a flexible architecture that spans automation levels 3-5, thereby providing a comprehensive functional safety archi-tecture that leverages and makes efficient use of computer vision and ADAS techniques for diversity and redundancy, provides a platform for a flexible, reliable driving software stack, along with deep learning tools. The SoC(s) 1104 may be faster, more reliable, and even more energy-efficient and space-efficient than conventional systems. For example, the accelerator(s) 1114, when combined with the CPU(s) 1106, the GPU(s) 1108, and the data store(s) 1116, may provide for a fast, efficient platform for level 3-5 autonomous vehicles.

The technology thus provides capabilities and function-ality that cannot be achieved by conventional systems. For example, computer vision algorithms may be executed on CPUs, which may be configured using high-level program-ming language, such as the C programming language, to execute a wide variety of processing algorithms across a wide variety of visual data. However, CPUs are oftentimes unable to meet the performance requirements of many computer vision applications, such as those related to execution time and power consumption, for example. In particular, many CPUs are unable to execute complex object detection algorithms in real-time, which is a requirement of in-vehicle ADAS applications, and a requirement for practical Level 3-5 autonomous vehicles.

In contrast to conventional systems, by providing a CPU complex, GPU complex, and a hardware acceleration clus-ter, the technology described herein allows for multiple neural networks to be performed simultaneously and/or sequentially, and for the results to be combined together to enable Level 3-5 autonomous driving functionality. For example, a CNN executing on the DLA or dGPU (e.g., the GPU(s) 1120) may include a text and word recognition, allowing the supercomputer to read and understand traffic signs, including signs for which the neural network has not been specifically trained. The DLA may further include a neural network that is able to identify, interpret, and provides semantic understanding of the sign, and to pass that semantic understanding to the path planning modules running on the CPU Complex.

As another example, multiple neural networks may be run simultaneously, as is required for Level 3, 4, or 5 driving. For example, a warning sign consisting of "Caution: flashing lights indicate icy conditions," along with an electric light, may be independently or collectively interpreted by several neural networks. The sign itself may be identified as a traffic sign by a first deployed neural network (e.g., a neural network that has been trained), the text "Flashing lights indicate icy conditions" may be interpreted by a second deployed neural network, which informs the vehicle's path planning software (preferably executing on the CPU Com-plex) that when flashing lights are detected, icy conditions exist. The flashing light may be identified by operating a third deployed neural network over multiple frames, inform-ing the vehicle's path-planning software of the presence (or absence) of flashing lights. All three neural networks may run simultaneously, such as within the DLA and/or on the GPU(s) 1108.

In some examples, a CNN for facial recognition and vehicle owner identification may use data from camera sensors to identify the presence of an authorized driver and/or owner of the vehicle 1100. The always on sensor processing engine may be used to unlock the vehicle when the owner approaches the driver door and turn on the lights, and, in security mode, to disable the vehicle when the owner leaves the vehicle. In this way, the SoC(s) 1104 provide for security against theft and/or carjacking.

In another example, a CNN for emergency vehicle detec-tion and identification may use data from microphones 1196 to detect and identify emergency vehicle sirens. In contrast to conventional systems, that use general classifiers to detect sirens and manually extract features, the SoC(s) 1104 use the CNN for classifying environmental and urban sounds, as well as classifying visual data. In a preferred embodiment, the CNN running on the DLA is trained to identify the relative closing speed of the emergency vehicle (e.g., by using the Doppler Effect). The CNN may also be trained to identify emergency vehicles specific to the local area in which the vehicle is operating, as identified by GNSS sensor(s) 1158. Thus, for example, when operating in Europe the CNN will seek to detect European sirens, and when in the United States the CNN will seek to identify only North American sirens. Once an emergency vehicle is detected, a control program may be used to execute an emergency vehicle safety routine, slowing the vehicle, pull-ing over to the side of the road, parking the vehicle, and/or idling the vehicle, with the assistance of ultrasonic sensors 1162, until the emergency vehicle(s) passes.

The vehicle may include a CPU(s) 1118 (e.g., discrete CPU(s), or dCPU(s)), that may be coupled to the SoC(s) 1104 via a high-speed interconnect (e.g., PCIe). The CPU(s) 1118 may include an X86 processor, for example. The CPU(s) 1118 may be used to perform any of a variety of functions, including arbitrating potentially inconsistent results between ADAS sensors and the SoC(s) 1104, and/or monitoring the status and health of the controller(s) 1136 and/or infotainment SoC 1130, for example.

The vehicle 1100 may include a GPU(s) 1120 (e.g., discrete GPU(s), or dGPU(s)), that may be coupled to the SoC(s) 1104 via a high-speed interconnect (e.g., NVIDIA's NVLINK). The GPU(s) 1120 may provide additional artificial intelligence functionality, such as by executing redundant and/or different neural networks, and may be used to train and/or update neural networks based on input (e.g., sensor data) from sensors of the vehicle 1100.

The vehicle 1100 may further include the network interface 1124 which may include one or more wireless antennas 1126 (e.g., one or more wireless antennas for different communication protocols, such as a cellular antenna, a Bluetooth antenna, etc.). The network interface 1124 may be used to enable wireless connectivity over the Internet with the cloud (e.g., with the server(s) 1178 and/or other network devices), with other vehicles, and/or with computing devices (e.g., client devices of passengers). To communicate with other vehicles, a direct link may be established between the two vehicles and/or an indirect link may be established (e.g., across networks and over the Internet). Direct links may be provided using a vehicle-to-vehicle communication link. The vehicle-to-vehicle communication link may provide the vehicle 1100 information about vehicles in proximity to the vehicle 1100 (e.g., vehicles in front of, on the side of, and/or behind the vehicle 1100). This functionality may be part of a cooperative adaptive cruise control functionality of the vehicle 1100.

The network interface 1124 may include a SoC that provides modulation and demodulation functionality and enables the controller(s) 1136 to communicate over wireless networks. The network interface 1124 may include a radio frequency front-end for up-conversion from baseband to radio frequency, and down conversion from radio frequency to baseband. The frequency conversions may be performed through well-known processes, and/or may be performed using super-heterodyne processes. In some examples, the radio frequency front end functionality may be provided by a separate chip. The network interface may include wireless functionality for communicating over LTE, WCDMA, UMTS, GSM, CDMA2000, Bluetooth, Bluetooth LE, Wi-Fi, Z-Wave, ZigBee, LoRaWAN, and/or other wireless protocols.

The vehicle 1100 may further include data store(s) 1128 which may include off-chip (e.g., off the SoC(s) 1104) storage. The data store(s) 1128 may include one or more storage elements including RAM, SRAM, DRAM, VRAM, Flash, hard disks, and/or other components and/or devices that may store at least one bit of data.

The vehicle 1100 may further include GNSS sensor(s) 1158. The GNSS sensor(s) 1158 (e.g., GPS, assisted GPS sensors, differential GPS (DGPS) sensors, etc.), to assist in mapping, perception, occupancy grid generation, and/or path planning functions. Any number of GNSS sensor(s) 1158 may be used, including, for example and without limitation, a GPS using a USB connector with an Ethernet to Serial (RS-232) bridge.

The vehicle 1100 may further include RADAR sensor(s) 1160. The RADAR sensor(s) 1160 may be used by the vehicle 1100 for long-range vehicle detection, even in darkness and/or severe weather conditions. RADAR functional safety levels may be ASIL B. The RADAR sensor(s) 1160 may use the CAN and/or the bus 1102 (e.g., to transmit data generated by the RADAR sensor(s) 1160) for control and to access object tracking data, with access to Ethernet to access raw data in some examples. A wide variety of RADAR sensor types may be used. For example, and without limitation, the RADAR sensor(s) 1160 may be suitable for front, rear, and side RADAR use. In some example, Pulse Doppler RADAR sensor(s) are used.

The RADAR sensor(s) 1160 may include different configurations, such as long range with narrow field of view, short range with wide field of view, short range side coverage, etc. In some examples, long-range RADAR may be used for adaptive cruise control functionality. The long-range RADAR systems may provide a broad field of view realized by two or more independent scans, such as within a 250 m range. The RADAR sensor(s) 1160 may help in distinguishing between static and moving objects, and may be used by ADAS systems for emergency brake assist and forward collision warning. Long-range RADAR sensors may include monostatic multimodal RADAR with multiple (e.g., six or more) fixed RADAR antennae and a high-speed CAN and FlexRay interface. In an example with six antennae, the central four antennae may create a focused beam pattern, designed to record the vehicle's 1100 surroundings at higher speeds with minimal interference from traffic in adjacent lanes. The other two antennae may expand the field of view, making it possible to quickly detect vehicles entering or leaving the vehicle's 1100 lane.

Mid-range RADAR systems may include, as an example, a range of up to 1160 m (front) or 80 m (rear), and a field of view of up to 42 degrees (front) or 1150 degrees (rear). Short-range RADAR systems may include, without limitation, RADAR sensors designed to be installed at both ends of the rear bumper. When installed at both ends of the rear bumper, such a RADAR sensor systems may create two beams that constantly monitor the blind spot in the rear and next to the vehicle.

Short-range RADAR systems may be used in an ADAS system for blind spot detection and/or lane change assist.

The vehicle 1100 may further include ultrasonic sensor(s) 1162. The ultrasonic sensor(s) 1162, which may be positioned at the front, back, and/or the sides of the vehicle 1100, may be used for park assist and/or to create and update an occupancy grid. A wide variety of ultrasonic sensor(s) 1162 may be used, and different ultrasonic sensor(s) 1162 may be used for different ranges of detection (e.g., 2.5 m, 4 m). The ultrasonic sensor(s) 1162 may operate at functional safety levels of ASIL B.

The vehicle 1100 may include LIDAR sensor(s) 1164. The LIDAR sensor(s) 1164 may be used for object and pedestrian detection, emergency braking, collision avoidance, and/or other functions. The LIDAR sensor(s) 1164 may be functional safety level ASIL B. In some examples, the vehicle 1100 may include multiple LIDAR sensors 1164 (e.g., two, four, six, etc.) that may use Ethernet (e.g., to provide data to a Gigabit Ethernet switch).

In some examples, the LIDAR sensor(s) 1164 may be capable of providing a list of objects and their distances for a 360-degree field of view. Commercially available LIDAR sensor(s) 1164 may have an advertised range of approximately 1100 m, with an accuracy of 2 cm-3 cm, and with support for a 1100 Mbps Ethernet connection, for example.

In some examples, one or more non-protruding LIDAR sensors 1164 may be used. In such examples, the LIDAR sensor(s) 1164 may be implemented as a small device that may be embedded into the front, rear, sides, and/or corners of the vehicle 1100. The LIDAR sensor(s) 1164, in such examples, may provide up to a 120-degree horizontal and 35-degree vertical field-of-view, with a 200 m range even for low-reflectivity objects. Front-mounted LIDAR sensor(s) 1164 may be configured for a horizontal field of view between 45 degrees and 135 degrees.

In some examples, LIDAR technologies, such as 3D flash LIDAR, may also be used. 3D Flash LIDAR uses a flash of a laser as a transmission source, to illuminate vehicle surroundings up to approximately 200 m. A flash LIDAR unit includes a receptor, which records the laser pulse transit time and the reflected light on each pixel, which in turn corresponds to the range from the vehicle to the objects. Flash LIDAR may allow for highly accurate and distortion-free images of the surroundings to be generated with every laser flash. In some examples, four flash LIDAR sensors may be deployed, one at each side of the vehicle 1100. Available 3D flash LIDAR systems include a solid-state 3D staring array LIDAR camera with no moving parts other than a fan (e.g., a non-scanning LIDAR device). The flash LIDAR device may use a 5 nanosecond class I (eye-safe) laser pulse per frame and may capture the reflected laser light in the form of 3D range point clouds and co-registered intensity data. By using flash LIDAR, and because flash LIDAR is a solid-state device with no moving parts, the LIDAR sensor(s) 1164 may be less susceptible to motion blur, vibration, and/or shock.

The vehicle may further include IMU sensor(s) 1166. The IMU sensor(s) 1166 may be located at a center of the rear axle of the vehicle 1100, in some examples. The IMU sensor(s) 1166 may include, for example and without limitation, an accelerometer(s), a magnetometer(s), a gyroscope(s), a magnetic compass(es), and/or other sensor types. In some examples, such as in six-axis applications, the IMU sensor(s) 1166 may include accelerometers and gyroscopes, while in nine-axis applications, the IMU sensor(s) 1166 may include accelerometers, gyroscopes, and magnetometers.

In some embodiments, the IMU sensor(s) 1166 may be implemented as a miniature, high performance GPS-Aided Inertial Navigation System (GPS/INS) that combines micro-electro-mechanical systems (MEMS) inertial sensors, a high-sensitivity GPS receiver, and advanced Kalman filtering algorithms to provide estimates of position, velocity, and attitude. As such, in some examples, the IMU sensor(s) 1166 may enable the vehicle 1100 to estimate heading without requiring input from a magnetic sensor by directly observing and correlating the changes in velocity from GPS to the IMU sensor(s) 1166. In some examples, the IMU sensor(s) 1166 and the GNSS sensor(s) 1158 may be combined in a single integrated unit.

The vehicle may include microphone(s) 1196 placed in and/or around the vehicle 1100. The microphone(s) 1196 may be used for emergency vehicle detection and identification, among other things.

The vehicle may further include any number of camera types, including stereo camera(s) 1168, wide-view camera(s) 1170, infrared camera(s) 1172, surround camera(s) 1174, long-range and/or mid-range camera(s) 1198, and/or other camera types. The cameras may be used to capture image data around an entire periphery of the vehicle 1100. The types of cameras used depends on the embodiments and requirements for the vehicle 1100, and any combination of camera types may be used to provide the necessary coverage around the vehicle 1100. In addition, the number of cameras may differ depending on the embodiment. For example, the vehicle may include six cameras, seven cameras, ten cameras, twelve cameras, and/or another number of cameras. The cameras may support, as an example and without limitation, Gigabit Multimedia Serial Link (GMSL) and/or Gigabit Ethernet. Each of the camera(s) is described with more detail herein with respect to FIG. 11A and FIG. 11B.

The vehicle 1100 may further include vibration sensor(s) 1142. The vibration sensor(s) 1142 may measure vibrations of components of the vehicle, such as the axle(s). For example, changes in vibrations may indicate a change in road surfaces. In another example, when two or more vibration sensors 1142 are used, the differences between the vibrations may be used to determine friction or slippage of the road surface (e.g., when the difference in vibration is between a power-driven axle and a freely rotating axle).

The vehicle 1100 may include an ADAS system 1138. The ADAS system 1138 may include a SoC, in some examples. The ADAS system 1138 may include autonomous/adaptive/automatic cruise control (ACC), cooperative adaptive cruise control (CACC), forward crash warning (FCW), automatic emergency braking (AEB), lane departure warnings (LDW), lane keep assist (LKA), blind spot warning (BSW), rear cross-traffic warning (RCTW), collision warning systems (CWS), lane centering (LC), and/or other features and functionality.

The ACC systems may use RADAR sensor(s) 1160, LIDAR sensor(s) 1164, and/or a camera(s). The ACC systems may include longitudinal ACC and/or lateral ACC. Longitudinal ACC monitors and controls the distance to the vehicle immediately ahead of the vehicle 1100 and automatically adjust the vehicle speed to maintain a safe distance from vehicles ahead. Lateral ACC performs distance keeping, and advises the vehicle 1100 to change lanes when necessary. Lateral ACC is related to other ADAS applications such as LCA and CWS.

CACC uses information from other vehicles that may be received via the network interface 1124 and/or the wireless antenna(s) 1126 from other vehicles via a wireless link, or indirectly, over a network connection (e.g., over the Internet). Direct links may be provided by a vehicle-to-vehicle (V2V) communication link, while indirect links may be infrastructure-to-vehicle (I2V) communication link. In general, the V2V communication concept provides information about the immediately preceding vehicles (e.g., vehicles immediately ahead of and in the same lane as the vehicle 1100), while the I2V communication concept provides information about traffic further ahead. CACC systems may include either or both I2V and V2V information sources. Given the information of the vehicles ahead of the vehicle 1100, CACC may be more reliable and it has potential to improve traffic flow smoothness and reduce congestion on the road.

FCW systems are designed to alert the driver to a hazard, so that the driver may take corrective action. FCW systems use a front-facing camera and/or RADAR sensor(s) 1160, coupled to a dedicated processor, DSP, FPGA, and/or ASIC, that is electrically coupled to driver feedback, such as a display, speaker, and/or vibrating component. FCW systems may provide a warning, such as in the form of a sound, visual warning, vibration and/or a quick brake pulse.

AEB systems detect an impending forward collision with another vehicle or other object, and may automatically apply the brakes if the driver does not take corrective action within a specified time or distance parameter. AEB systems may use front-facing camera(s) and/or RADAR sensor(s) 1160, coupled to a dedicated processor, DSP, FPGA, and/or ASIC. When the AEB system detects a hazard, it typically first alerts the driver to take corrective action to avoid the collision and, if the driver does not take corrective action, the AEB system may automatically apply the brakes in an effort to prevent, or at least mitigate, the impact of the predicted collision. AEB systems, may include techniques such as dynamic brake support and/or crash imminent braking.

LDW systems provide visual, audible, and/or tactile warnings, such as steering wheel or seat vibrations, to alert the driver when the vehicle 1100 crosses lane markings. A LDW system does not activate when the driver indicates an intentional lane departure, by activating a turn signal. LDW systems may use front-side facing cameras, coupled to a dedicated processor, DSP, FPGA, and/or ASIC, that is electrically coupled to driver feedback, such as a display, speaker, and/or vibrating component.

LKA systems are a variation of LDW systems. LKA systems provide steering input or braking to correct the vehicle 1100 if the vehicle 1100 starts to exit the lane.

BSW systems detects and warn the driver of vehicles in an automobile's blind spot. BSW systems may provide a visual, audible, and/or tactile alert to indicate that merging or changing lanes is unsafe. The system may provide an additional warning when the driver uses a turn signal. BSW systems may use rear-side facing camera(s) and/or RADAR sensor(s) 1160, coupled to a dedicated processor, DSP, FPGA, and/or ASIC, that is electrically coupled to driver feedback, such as a display, speaker, and/or vibrating component.

RCTW systems may provide visual, audible, and/or tactile notification when an object is detected outside the rear-camera range when the vehicle 1100 is backing up. Some RCTW systems include AEB to ensure that the vehicle brakes are applied to avoid a crash. RCTW systems may use one or more rear-facing RADAR sensor(s) 1160, coupled to a dedicated processor, DSP, FPGA, and/or ASIC, that is electrically coupled to driver feedback, such as a display, speaker, and/or vibrating component.

Conventional ADAS systems may be prone to false positive results which may be annoying and distracting to a driver, but typically are not catastrophic, because the ADAS systems alert the driver and allow the driver to decide whether a safety condition truly exists and act accordingly. However, in an autonomous vehicle 1100, the vehicle 1100 itself must, in the case of conflicting results, decide whether to heed the result from a primary computer or a secondary computer (e.g., a first controller 1136 or a second controller 1136). For example, in some embodiments, the ADAS system 1138 may be a backup and/or secondary computer for providing perception information to a backup computer rationality module. The backup computer rationality monitor may run a redundant diverse software on hardware components to detect faults in perception and dynamic driving tasks. Outputs from the ADAS system 1138 may be provided to a supervisory MCU. If outputs from the primary computer and the secondary computer conflict, the supervisory MCU must determine how to reconcile the conflict to ensure safe operation.

In some examples, the primary computer may be configured to provide the supervisory MCU with a confidence score, indicating the primary computer's confidence in the chosen result. If the confidence score exceeds a threshold, the supervisory MCU may follow the primary computer's direction, regardless of whether the secondary computer provides a conflicting or inconsistent result. Where the confidence score does not meet the threshold, and where the primary and secondary computer indicate different results (e.g., the conflict), the supervisory MCU may arbitrate between the computers to determine the appropriate outcome.

The supervisory MCU may be configured to run a neural network(s) that is trained and configured to determine, based on outputs from the primary computer and the secondary computer, conditions under which the secondary computer provides false alarms. Thus, the neural network(s) in the supervisory MCU may learn when the secondary computer's output may be trusted, and when it cannot. For example, when the secondary computer is a RADAR-based FCW system, a neural network(s) in the supervisory MCU may learn when the FCW system is identifying metallic objects that are not, in fact, hazards, such as a drainage grate or manhole cover that triggers an alarm. Similarly, when the secondary computer is a camera-based LDW system, a neural network in the supervisory MCU may learn to override the LDW when bicyclists or pedestrians are present and a lane departure is, in fact, the safest maneuver. In embodiments that include a neural network(s) running on the supervisory MCU, the supervisory MCU may include at least one of a DLA or GPU suitable for running the neural network(s) with associated memory. In preferred embodiments, the supervisory MCU may comprise and/or be included as a component of the SoC(s) 1104.

In other examples, ADAS system 1138 may include a secondary computer that performs ADAS functionality using traditional rules of computer vision. As such, the secondary computer may use classic computer vision rules (if-then), and the presence of a neural network(s) in the supervisory MCU may improve reliability, safety and performance. For example, the diverse implementation and intentional non-identity makes the overall system more fault-tolerant, especially to faults caused by software (or software-hardware interface) functionality. For example, if there is a software bug or error in the software running on the primary computer, and the non-identical software code running on the secondary computer provides the same overall result, the supervisory MCU may have greater confidence that the overall result is correct, and the bug in software or hardware on primary computer is not causing material error.

In some examples, the output of the ADAS system 1138 may be fed into the primary computer's perception block and/or the primary computer's dynamic driving task block. For example, if the ADAS system 1138 indicates a forward crash warning due to an object immediately ahead, the perception block may use this information when identifying objects. In other examples, the secondary computer may have its own neural network which is trained and thus reduces the risk of false positives, as described herein.

The vehicle 1100 may further include the infotainment SoC 1130 (e.g., an in-vehicle infotainment system (IVI)). Although illustrated and described as a SoC, the infotainment system may not be a SoC, and may include two or more discrete components. The infotainment SoC 1130 may include a combination of hardware and software that may be used to provide audio (e.g., music, a personal digital assistant, navigational instructions, news, radio, etc.), video (e.g., TV, movies, streaming, etc.), phone (e.g., hands-free calling), network connectivity (e.g., LTE, Wi-Fi, etc.), and/or information services (e.g., navigation systems, rear-parking assistance, a radio data system, vehicle related information such as fuel level, total distance covered, brake fuel level, oil level, door open/close, air filter information, etc.) to the vehicle 1100. For example, the infotainment SoC 1130 may radios, disk players, navigation systems, video players, USB and Bluetooth connectivity, carputers, in-car entertainment, Wi-Fi, steering wheel audio controls, hands free voice control, a heads-up display (HUD), an HMI display 1134, a telematics device, a control panel (e.g., for controlling and/or interacting with various components, features, and/or systems), and/or other components. The infotainment SoC 1130 may further be used to provide information (e.g., visual and/or audible) to a user(s) of the vehicle, such as information from the ADAS system 1138, autonomous driving information such as planned vehicle maneuvers, trajectories, surrounding environment information (e.g., intersection information, vehicle information, road information, etc.), and/or other information.

The infotainment SoC 1130 may include GPU functionality. The infotainment SoC 1130 may communicate over the bus 1102 (e.g., CAN bus, Ethernet, etc.) with other devices, systems, and/or components of the vehicle 1100. In some examples, the infotainment SoC 1130 may be coupled to a supervisory MCU such that the GPU of the infotainment system may perform some self-driving functions in the event that the primary controller(s) 1136 (e.g., the primary and/or backup computers of the vehicle 1100) fail. In such an example, the infotainment SoC 1130 may put the vehicle 1100 into a chauffeur to safe stop mode, as described herein.

The vehicle 1100 may further include an instrument cluster 1132 (e.g., a digital dash, an electronic instrument cluster, a digital instrument panel, etc.). The instrument cluster 1132 may include a controller and/or supercomputer (e.g., a discrete controller or supercomputer). The instrument cluster 1132 may include a set of instrumentation such as a speedometer, fuel level, oil pressure, tachometer, odometer, turn indicators, gearshift position indicator, seat belt warning light(s), parking-brake warning light(s), engine-malfunction light(s), airbag (SRS) system information, lighting controls, safety system controls, navigation information, etc. In some examples, information may be displayed and/or shared among the infotainment SoC 1130 and the instrument cluster 1132. In other words, the instrument cluster 1132 may be included as part of the infotainment SoC 1130, or vice versa.

Figure 11D:
FIG. 11D is a system diagram for communication between cloud-based server(s) and the example autonomous vehicle of FIG. 11A, in accordance with some embodiments of the present disclosure.

FIG. 11D is a system diagram for communication between cloud-based server(s) and the example autonomous vehicle 1100 of FIG. 11A, in accordance with some embodiments of the present disclosure. The system 1176 may include server(s) 1178, network(s) 1190, and vehicles, including the vehicle 1100. The server(s) 1178 may include a plurality of GPUs 1184(A)-1184(H) (collectively referred to herein as GPUs 1184), PCIe switches 1182(A)-1182(H) (collectively referred to herein as PCIe switches 1182), and/or CPUs 1180(A)-1180(B) (collectively referred to herein as CPUs 1180). The GPUs 1184, the CPUs 1180, and the PCIe switches may be interconnected with high-speed interconnects such as, for example and without limitation, NVLink interfaces 1188 developed by NVIDIA and/or PCIe connections 1186. In some examples, the GPUs 1184 are connected via NVLink and/or NVSwitch SoC and the GPUs 1184 and the PCIe switches 1182 are connected via PCIe interconnects. Although eight GPUs 1184, two CPUs 1180, and two PCIe switches are illustrated, this is not intended to be limiting. Depending on the embodiment, each of the server(s) 1178 may include any number of GPUs 1184, CPUs 1180, and/or PCIe switches. For example, the server(s) 1178 may each include eight, sixteen, thirty-two, and/or more GPUs 1184.

The server(s) 1178 may receive, over the network(s) 1190 and from the vehicles, image data representative of images showing unexpected or changed road conditions, such as recently commenced road-work. The server(s) 1178 may transmit, over the network(s) 1190 and to the vehicles, neural networks 1192, updated neural networks 1192, and/or map information 1194, including information regarding traffic and road conditions. The updates to the map information 1194 may include updates for the HD map 1122, such as information regarding construction sites, potholes, detours, flooding, and/or other obstructions. In some examples, the neural networks 1192, the updated neural networks 1192, and/or the map information 1194 may have resulted from new training and/or experiences represented in data received from any number of vehicles in the environment, and/or based on training performed at a datacenter (e.g., using the server(s) 1178 and/or other servers).

The server(s) 1178 may be used to train machine learning models (e.g., neural networks) based on training data. The training data may be generated by the vehicles, and/or may be generated in a simulation (e.g., using a game engine). In some examples, the training data is tagged (e.g., where the neural network benefits from supervised learning) and/or undergoes other pre-processing, while in other examples the training data is not tagged and/or pre-processed (e.g., where the neural network does not require supervised learning). Training may be executed according to any one or more classes of machine learning techniques, including, without limitation, classes such as: supervised training, semi-supervised training, unsupervised training, self-learning, reinforcement learning, federated learning, transfer learning, feature learning (including principal component and cluster analyses), multi-linear subspace learning, manifold learning, representation learning (including spare dictionary learning), rule-based machine learning, anomaly detection, and any variants or combinations therefor. Once the machine learning models are trained, the machine learning models may be used by the vehicles (e.g., transmitted to the vehicles over the network(s) 1190, and/or the machine learning models may be used by the server(s) 1178 to remotely monitor the vehicles.

In some examples, the server(s) 1178 may receive data from the vehicles and apply the data to up-to-date real-time neural networks for real-time intelligent inferencing. The server(s) 1178 may include deep-learning supercomputers and/or dedicated AI computers powered by GPU(s) 1184, such as a DGX and DGX Station machines developed by NVIDIA. However, in some examples, the server(s) 1178 may include deep learning infrastructure that use only CPU-powered datacenters.

The deep-learning infrastructure of the server(s) 1178 may be capable of fast, real-time inferencing, and may use that capability to evaluate and verify the health of the processors, software, and/or associated hardware in the vehicle 1100. For example, the deep-learning infrastructure may receive periodic updates from the vehicle 1100, such as a sequence of images and/or objects that the vehicle 1100 has located in that sequence of images (e.g., via computer vision and/or other machine learning object classification techniques). The deep-learning infrastructure may run its own neural network to identify the objects and compare them with the objects identified by the vehicle 1100 and, if the results do not match and the infrastructure concludes that the AI in the vehicle 1100 is malfunctioning, the server(s) 1178 may transmit a signal to the vehicle 1100 instructing a fail-safe computer of the vehicle 1100 to assume control, notify the passengers, and complete a safe parking maneuver.

For inferencing, the server(s) 1178 may include the GPU(s) 1184 and one or more programmable inference accelerators (e.g., NVIDIA's TensorRT). The combination of GPU-powered servers and inference acceleration may make real-time responsiveness possible. In other examples, such as where performance is less critical, servers powered by CPUs, FPGAs, and other processors may be used for inferencing.

Example Computing Device

Figure 12:
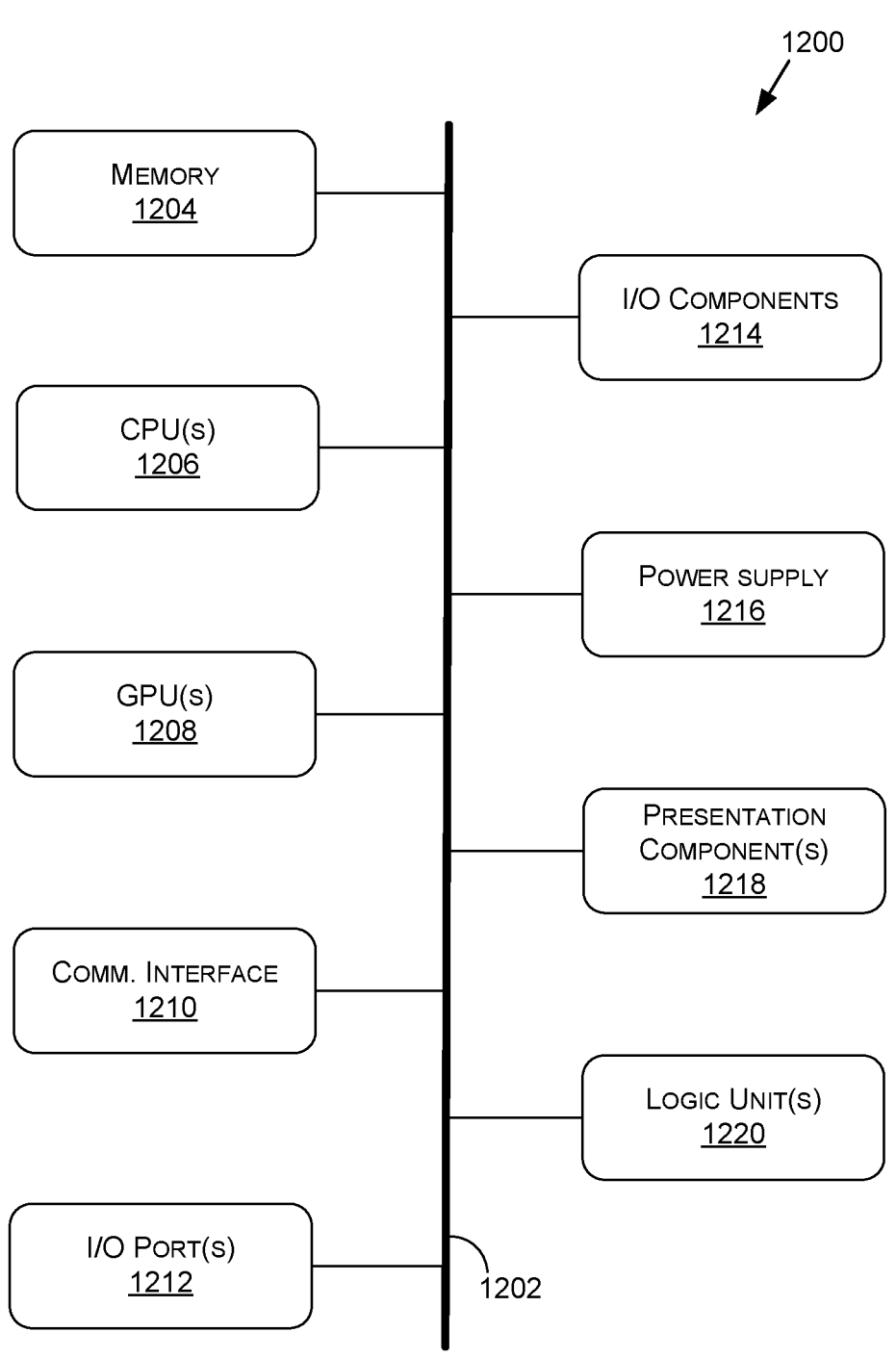
FIG. 12 is a block diagram of an example computing device suitable for use in implementing some embodiments of the present disclosure.

FIG. 12 is a block diagram of an example computing device(s) 1200 suitable for use in implementing some embodiments of the present disclosure. Computing device 1200 may include an interconnect system 1202 that directly or indirectly couples the following devices: memory 1204, one or more central processing units (CPUs) 1206, one or more graphics processing units (GPUs) 1208, a communication interface 1210, input/output (I/O) ports 1212, input/output components 1214, a power supply 1216, one or more presentation components 1218 (e.g., display(s)), and one or more logic units 1220. In at least one embodiment, the computing device(s) 1200 may comprise one or more virtual machines (VMs), and/or any of the components thereof may comprise virtual components (e.g., virtual hardware components). For non-limiting examples, one or more of the GPUs 1208 may comprise one or more vGPUs, one or more of the CPUs 1206 may comprise one or more vCPUs, and/or one or more of the logic units 1220 may comprise one or more virtual logic units. As such, a computing device(s) 1200 may include discrete components (e.g., a full GPU dedicated to the computing device 1200), virtual components (e.g., a portion of a GPU dedicated to the computing device 1200), or a combination thereof.

Although the various blocks of FIG. 12 are shown as connected via the interconnect system 1202 with lines, this is not intended to be limiting and is for clarity only. For example, in some embodiments, a presentation component 1218, such as a display device, may be considered an I/O component 1214 (e.g., if the display is a touch screen). As another example, the CPUs 1206 and/or GPUs 1208 may include memory (e.g., the memory 1204 may be representative of a storage device in addition to the memory of the GPUs 1208, the CPUs 1206, and/or other components). In other words, the computing device of FIG. 12 is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 12.

The interconnect system 1202 may represent one or more links or busses, such as an address bus, a data bus, a control bus, or a combination thereof. The interconnect system 1202 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus or link. In some embodiments, there are direct connections between components. As an example, the CPU 1206 may be directly connected to the memory 1204. Further, the CPU 1206 may be directly connected to the GPU 1208. Where there is direct, or point-to-point connection between components, the interconnect system 1202 may include a PCIe link to carry out the connection. In these examples, a PCI bus need not be included in the computing device 1200.

The memory 1204 may include any of a variety of computer-readable media. The computer-readable media may be any available media that may be accessed by the computing device 1200. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 1204 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by computing device 1200. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

The CPU(s) 1206 may be configured to execute at least some of the computer-readable instructions to control one or more components of the computing device 1200 to perform one or more of the methods and/or processes described herein. The CPU(s) 1206 may each include one or more cores (e.g., one, two, four, eight, twenty-eight, seventy-two, etc.) that are capable of handling a multitude of software threads simultaneously. The CPU(s) 1206 may include any type of processor, and may include different types of processors depending on the type of computing device 1200 implemented (e.g., processors with fewer cores for mobile devices and processors with more cores for servers). For example, depending on the type of computing device 1200, the processor may be an Advanced RISC Machines (ARM) processor implemented using Reduced Instruction Set Computing (RISC) or an x86 processor implemented using Complex Instruction Set Computing (CISC). The computing device 1200 may include one or more CPUs 1206 in addition to one or more microprocessors or supplementary co-processors, such as math co-processors.

In addition to or alternatively from the CPU(s) 1206, the GPU(s) 1208 may be configured to execute at least some of the computer-readable instructions to control one or more components of the computing device 1200 to perform one or more of the methods and/or processes described herein. One or more of the GPU(s) 1208 may be an integrated GPU (e.g., with one or more of the CPU(s) 1206 and/or one or more of the GPU(s) 1208 may be a discrete GPU. In embodiments, one or more of the GPU(s) 1208 may be a coprocessor of one or more of the CPU(s) 1206. The GPU(s) 1208 may be used by the computing device 1200 to render graphics (e.g., 3D graphics) or perform general purpose computations. For example, the GPU(s) 1208 may be used for General-Purpose computing on GPUs (GPGPU). The GPU(s) 1208 may include hundreds or thousands of cores that are capable of handling hundreds or thousands of software threads simultaneously. The GPU(s) 1208 may generate pixel data for output images in response to rendering commands (e.g., rendering commands from the CPU(s) 1206 received via a host interface). The GPU(s) 1208 may include graphics memory, such as display memory, for storing pixel data or any other suitable data, such as GPGPU data. The display memory may be included as part of the memory 1204. The GPU(s) 1208 may include two or more GPUs operating in parallel (e.g., via a link). The link may directly connect the GPUs (e.g., using NVLINK) or may connect the GPUs through a switch (e.g., using NVSwitch). When combined together, each GPU 1208 may generate pixel data or GPGPU data for different portions of an output or for different outputs (e.g., a first GPU for a first image and a second GPU for a second image). Each GPU may include its own memory, or may share memory with other GPUs.

In addition to or alternatively from the CPU(s) 1206 and/or the GPU(s) 1208, the logic unit(s) 1220 may be configured to execute at least some of the computer-readable instructions to control one or more components of the computing device 1200 to perform one or more of the methods and/or processes described herein. In embodiments, the CPU(s) 1206, the GPU(s) 1208, and/or the logic unit(s) 1220 may discretely or jointly perform any combination of the methods, processes and/or portions thereof. One or more of the logic units 1220 may be part of and/or integrated in one or more of the CPU(s) 1206 and/or the GPU(s) 1208 and/or one or more of the logic units 1220 may be discrete components or otherwise external to the CPU(s) 1206 and/or the GPU(s) 1208. In embodiments, one or more of the logic units 1220 may be a coprocessor of one or more of the CPU(s) 1206 and/or one or more of the GPU(s) 1208.

Examples of the logic unit(s) 1220 include one or more processing cores and/or components thereof, such as Data Processing Units (DPUs), Tensor Cores (TCs), Tensor Processing Units (TPUs), Pixel Visual Cores (PVCs), Vision Processing Units (VPUs), Graphics Processing Clusters (GPCs), Texture Processing Clusters (TPCs), Streaming Multiprocessors (SMs), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), input/output (I/O) elements, peripheral component interconnect (PCI) or peripheral component interconnect express (PCIe) elements, and/or the like.

The communication interface 1210 may include one or more receivers, transmitters, and/or transceivers that enable the computing device 1200 to communicate with other computing devices via an electronic communication network, included wired and/or wireless communications. The communication interface 1210 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet. In one or more embodiments, logic unit(s) 1220 and/or communication interface 1210 may include one or more data processing units (DPUs) to transmit data received over a network and/or through interconnect system 1202 directly to (e.g., a memory of) one or more GPU(s) 1208.

The I/O ports 1212 may enable the computing device 1200 to be logically coupled to other devices including the I/O components 1214, the presentation component(s) 1218, and/or other components, some of which may be built in to (e.g., integrated in) the computing device 1200. Illustrative I/O components 1214 include a microphone, mouse, keyboard, joystick, game pad, game controller, satellite dish, scanner, printer, wireless device, etc. The I/O components 1214 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 1200. The computing device 1200 may be include depth cameras, such as stereoscopic camera systems, infrared camera systems, RGB camera systems, touchscreen technology, and combinations of these, for gesture detection and recognition. Additionally, the computing device 1200 may include accelerometers or gyroscopes (e.g., as part of an inertia measurement unit (IMU)) that enable detection of motion. In some examples, the output of the accelerometers or gyroscopes may be used by the computing device 1200 to render immersive augmented reality or virtual reality.

The power supply 1216 may include a hard-wired power supply, a battery power supply, or a combination thereof. The power supply 1216 may provide power to the computing device 1200 to enable the components of the computing device 1200 to operate.

The presentation component(s) 1218 may include a display (e.g., a monitor, a touch screen, a television screen, a heads-up-display (HUD), other display types, or a combination thereof), speakers, and/or other presentation components. The presentation component(s) 1218 may receive data from other components (e.g., the GPU(s) 1208, the CPU(s) 1206, DPUs, etc.), and output the data (e.g., as an image, video, sound, etc.).

Example Data Center

Figure 13:
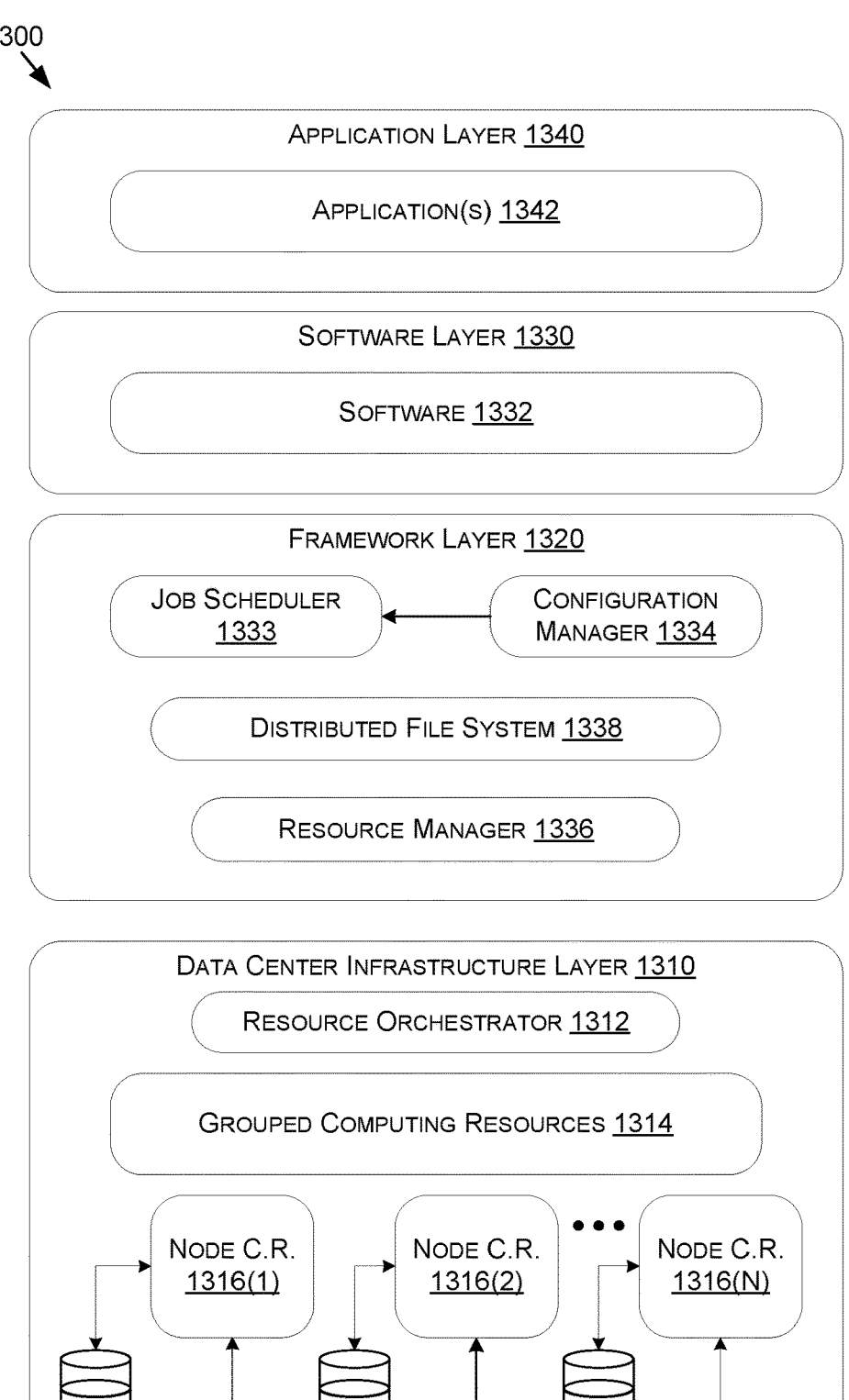
FIG. 13 is a block diagram of an example data center suitable for use in implementing some embodiments of the present disclosure.

FIG. 13 illustrates an example data center 1300 that may be used in at least one embodiments of the present disclosure. The data center 1300 may include a data center infrastructure layer 1310, a framework layer 1320, a software layer 1330, and/or an application layer 1340.

As shown in FIG. 13, the data center infrastructure layer 1310 may include a resource orchestrator 1312, grouped computing resources 1314, and node computing resources ("node C.R.s") 1316(1)-1316(N), where "N" represents any whole, positive integer. In at least one embodiment, node C.R.s 1316(1)-1316(N) may include, but are not limited to, any number of central processing units (CPUs) or other processors (including DPUs, accelerators, field programmable gate arrays (FPGAs), graphics processors or graphics processing units (GPUs), etc.), memory devices (e.g., dynamic read-only memory), storage devices (e.g., solid state or disk drives), network input/output (NW I/O) devices, network switches, virtual machines (VMs), power modules, and/or cooling modules, etc. In some embodiments, one or more node C.R.s from among node C.R.s 1316(1)-1316(N) may correspond to a server having one or more of the above-mentioned computing resources. In addition, in some embodiments, the node C.R.s 1316(1)-13161 (N) may include one or more virtual components, such as vGPUs, vCPUs, and/or the like, and/or one or more of the node C.R.s 1316(1)-1316(N) may correspond to a virtual machine (VM).

In at least one embodiment, grouped computing resources 1314 may include separate groupings of node C.R.s 1316 housed within one or more racks (not shown), or many racks housed in data centers at various geographical locations (also not shown). Separate groupings of node C.R.s 1316 within grouped computing resources 1314 may include grouped compute, network, memory or storage resources that may be configured or allocated to support one or more workloads. In at least one embodiment, several node C.R.s 1316 including CPUs, GPUs, DPUs, and/or other processors may be grouped within one or more racks to provide compute resources to support one or more workloads. The one or more racks may also include any number of power modules, cooling modules, and/or network switches, in any combination.

The resource orchestrator 1312 may configure or otherwise control one or more node C.R.s 1316(1)-1316(N) and/or grouped computing resources 1314. In at least one embodiment, resource orchestrator 1312 may include a software design infrastructure (SDI) management entity for the data center 1300. The resource orchestrator 1312 may include hardware, software, or some combination thereof.

In at least one embodiment, as shown in FIG. 13, framework layer 1320 may include a job scheduler 1333, a configuration manager 1334, a resource manager 1336, and/or a distributed file system 1338. The framework layer 1320 may include a framework to support software 1332 of software layer 1330 and/or one or more application(s) 1342 of application layer 1340. The software 1332 or application(s) 1342 may respectively include web-based service software or applications, such as those provided by Amazon Web Services, Google Cloud and Microsoft Azure. The framework layer 1320 may be, but is not limited to, a type of free and open-source software web application framework such as Apache Spark™ (hereinafter "Spark") that may utilize distributed file system 1338 for large-scale data processing (e.g., "big data"). In at least one embodiment, job scheduler 1333 may include a Spark driver to facilitate scheduling of workloads supported by various layers of data center 1300. The configuration manager 1334 may be capable of configuring different layers such as software layer 1330 and framework layer 1320 including Spark and distributed file system 1338 for supporting large-scale data processing. The resource manager 1336 may be capable of managing clustered or grouped computing resources mapped to or allocated for support of distributed file system 1338 and job scheduler 1333. In at least one embodiment, clustered or grouped computing resources may include grouped computing resource 1314 at data center infrastructure layer 1310. The resource manager 1336 may coordinate with resource orchestrator 1312 to manage these mapped or allocated computing resources.

In at least one embodiment, software 1332 included in software layer 1330 may include software used by at least portions of node C.R.s 1316(1)-1316(N), grouped computing resources 1314, and/or distributed file system 1338 of framework layer 1320. One or more types of software may include, but are not limited to, Internet web page search software, e-mail virus scan software, database software, and streaming video content software.

In at least one embodiment, application(s) 1342 included in application layer 1340 may include one or more types of applications used by at least portions of node C.R.s 1316 (1)-1316(N), grouped computing resources 1314, and/or distributed file system 1338 of framework layer 1320. One or more types of applications may include, but are not limited to, any number of a genomics application, a cognitive compute, and a machine learning application, including training or inferencing software, machine learning framework software (e.g., PyTorch, TensorFlow, Caffe, etc.), and/or other machine learning applications used in conjunction with one or more embodiments.

In at least one embodiment, any of configuration manager 1334, resource manager 1336, and resource orchestrator 1312 may implement any number and type of self-modifying actions based on any amount and type of data acquired in any technically feasible fashion. Self-modifying actions may relieve a data center operator of data center 1300 from making possibly bad configuration decisions and possibly avoiding underutilized and/or poor performing portions of a data center.

The data center 1300 may include tools, services, software or other resources to train one or more machine learning models or predict or infer information using one or more machine learning models according to one or more embodiments described herein. For example, a machine learning model(s) may be trained by calculating weight parameters according to a neural network architecture using software and/or computing resources described above with respect to the data center 1300. In at least one embodiment, trained or deployed machine learning models corresponding to one or more neural networks may be used to infer or predict information using resources described above with respect to the data center 1300 by using weight parameters calculated through one or more training techniques, such as but not limited to those described herein.

In at least one embodiment, the data center 1300 may use CPUs, application-specific integrated circuits (ASICs), GPUs, FPGAs, and/or other hardware (or virtual compute resources corresponding thereto) to perform training and/or inferencing using above-described resources. Moreover, one or more software and/or hardware resources described above may be configured as a service to allow users to train or performing inferencing of information, such as image recognition, speech recognition, or other artificial intelligence services.

Example Network Environments

Network environments suitable for use in implementing embodiments of the disclosure may include one or more client devices, servers, network attached storage (NAS), other backend devices, and/or other device types. The client devices, servers, and/or other device types (e.g., each device) may be implemented on one or more instances of the computing device(s) 1200 of FIG. 12—e.g., each device may include similar components, features, and/or functionality of the computing device(s) 1200. In addition, where backend devices (e.g., servers, NAS, etc.) are implemented, the backend devices may be included as part of a data center 1300, an example of which is described in more detail herein with respect to FIG. 13.

Components of a network environment may communicate with each other via a network(s), which may be wired, wireless, or both. The network may include multiple networks, or a network of networks. By way of example, the network may include one or more Wide Area Networks (WANs), one or more Local Area Networks (LANs), one or more public networks such as the Internet and/or a public switched telephone network (PSTN), and/or one or more private networks. Where the network includes a wireless telecommunications network, components such as a base station, a communications tower, or even access points (as well as other components) may provide wireless connectivity.

Compatible network environments may include one or more peer-to-peer network environments—in which case a server may not be included in a network environment—and one or more client-server network environments—in which case one or more servers may be included in a network environment. In peer-to-peer network environments, functionality described herein with respect to a server(s) may be implemented on any number of client devices.

In at least one embodiment, a network environment may include one or more cloud-based network environments, a distributed computing environment, a combination thereof, etc. A cloud-based network environment may include a framework layer, a job scheduler, a resource manager, and a distributed file system implemented on one or more of servers, which may include one or more core network servers and/or edge servers. A framework layer may include a framework to support software of a software layer and/or one or more application(s) of an application layer. The software or application(s) may respectively include web-based service software or applications. In embodiments, one or more of the client devices may use the web-based service software or applications (e.g., by accessing the service software and/or applications via one or more application programming interfaces (APIs)). The framework layer may be, but is not limited to, a type of free and open-source software web application framework such as that may use a distributed file system for large-scale data processing (e.g., "big data").

A cloud-based network environment may provide cloud computing and/or cloud storage that carries out any combination of computing and/or data storage functions described herein (or one or more portions thereof). Any of these various functions may be distributed over multiple locations from central or core servers (e.g., of one or more data centers that may be distributed across a state, a region, a country, the globe, etc.). If a connection to a user (e.g., a client device) is relatively close to an edge server(s), a core server(s) may designate at least a portion of the functionality to the edge server(s). A cloud-based network environment may be private (e.g., limited to a single organization), may be public (e.g., available to many organizations), and/or a combination thereof (e.g., a hybrid cloud environment).

The client device(s) may include at least some of the components, features, and functionality of the example computing device(s) 1200 described herein with respect to FIG. 12. By way of example and not limitation, a client device may be embodied as a Personal Computer (PC), a laptop computer, a mobile device, a smartphone, a tablet computer, a smart watch, a wearable computer, a Personal Digital Assistant (PDA), an MP3 player, a virtual reality headset, a Global Positioning System (GPS) or device, a video player, a video camera, a surveillance device or system, a vehicle, a boat, a flying vessel, a virtual machine, a drone, a robot, a handheld communications device, a hospital device, a gaming device or system, an entertainment system, a vehicle computer system, an embedded system controller, a remote control, an appliance, a consumer electronic device, a workstation, an edge device, any combination of these delineated devices, or any other suitable device.

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. A method comprising:
obtaining output data indicating predictions made by at least one machine learning model (MLM), the predictions corresponding to one or more objects represented in one or more data samples applied to the at least one MLM, and being based at least on compositions of attributes of the one or more objects;
evaluating the output data to determine one or more performance metric values corresponding to performance of the at least one MLM with respect to the predictions for a subset of the attributes;
computing one or more values representing a numerical quantity of additional data samples corresponding to the subset of the attributes, wherein the numerical quantity increases with one or more distances between the one or more performance metric values and one or more corresponding threshold values;
applying at least one input to one or more generative MLMs to generate, using the one or more values, the additional data samples; and
updating parameters comprised in the at least one MLM using the additional data samples.

2. The method of claim 1, wherein the one or more generative MLMs include a compositional generator that generates the additional data samples as compositions of a plurality of attributes of the subset of the attributes.

3. The method of claim 1, further comprising training the at least one MLM using a first training data set to determine the parameters, wherein the updating of the parameters includes refining the at least one MLM using a second training data set that is smaller than the first training data set.

4. The method of claim 1, wherein the numerical quantity corresponds to a first allocation of the subset of the attributes to a fixed computed number of samples allocated to being generated for the updating, and a second numerical quantity of second additional data samples that correspond to a second subset of the attributes correspond to a second allocation of the fixed computed number of samples.

5. The method of claim 1, wherein the one or more data samples and the additional data samples comprise images depicting the one or more objects.

6. The method of claim 1, wherein the one or more performance metric values correspond to inference accuracy of the at least one MLM for a temporal pattern represented over a plurality of video frames by values of the subset of the attributes over a plurality of the one or more data samples, and the additional data samples represent the temporal pattern.

7. The method of claim 6, wherein the temporal pattern corresponds to one or more of a frequency, an amplitude, a velocity, or a duration of one or more events represented using the plurality of video frames.

8. The method of claim 1, wherein the attributes define, for a person depicted in one or more images, one or more of: an age of the person, an ethnicity of the person, a hair length of the person, a head position of the person, whether the person is wearing glasses, whether the person has a beard, an emotion of the person, a blink rate of the person, an eyelid open magnitude of the person, eye makeup of the person, a blink amplitude of the person, a blink duration of the person, a facial pattern of the person, whether the person is wearing a mask, lightning conditions of the person, a facial expression of the person, whether the person is emphasized in the one or more images, whether a background of the person is emphasized in the one or more images, or whether a foreground of the person is emphasized in the one or more images.

9. The method of claim 1, wherein the one or more performance metric values correspond to data samples that each include a designated combination of attributes included in the subset of the attributes, and the numerical quantity is of the additional data samples that are to include the designated combination of attributes.

10. A system comprising:
one or more processing units to execute operations comprising:
obtaining output data indicating predictions made by at least one machine learning model (MLM), the predictions corresponding to one or more objects depicted in one or more first images applied to the at least one MLM, and being based at least on compositions of attributes of the one or more objects;
generating, using the output data, one or more performance metric values corresponding to performance of the at least one MLM with respect to the predictions for a subset of the attributes;
computing, using the one or more performance metric values, one or more values representing a numerical quantity of images corresponding to the subset of the attributes, wherein the numerical quantity increases with one or more distances between the one or more performance metric values and one or more corresponding threshold values;
applying at least one input to one or more generative MLMs to generate, using the one or more values, the images; and
updating at least one parameter comprised in the at least one MLM using at least the images.

11. The system of claim 10, wherein the at least one MLM is trained using a first training data set representing a plurality of attributes, the operations include selecting the subset of the attributes from the plurality of attributes to use for refining the at least one MLM, and the updating includes the refining of the at least one MLM using a second training data set representing the subset of the attributes.

12. The system of claim 10, wherein the one or more performance metric values correspond to inference accuracy of the at least one MLM for a combination of the attributes when a data sample of one or more data samples includes an object that corresponds to the combination of the attributes.

13. The system of claim 10, wherein the one or more performance metric values correspond to inference accuracy of the at least one MLM for a temporal pattern represented by values of the subset of the attributes over a plurality of images.

14. The system of claim 13, wherein the temporal pattern corresponds to one or more of a frequency, an amplitude, a velocity, or a duration of one or more events represented using the values of the subset of the attributes.

15. The system of claim 10, wherein the system is comprised in at least one of:
a control system for an autonomous or semi-autonomous machine;
a perception system for an autonomous or semi-autonomous machine;
a system for performing simulation operations;
a system for performing digital twin operations;
a system for performing deep learning operations;
a system implemented using an edge device;
a system implemented using a robot;
a system incorporating one or more virtual machines (VMs);
a system implemented at least partially in a data center;
a system including a collaborative creation platform for three-dimensional (3D) content; or
a system implemented at least partially using cloud computing resources.

16. At least one processor comprising:
one or more circuits to update parameters comprised in at least one machine learning model (MLM) using additional samples that correspond to a subset of attributes and are generated, using one or more values representing a numerical quantity of the additional samples, by one or more generative MLMs, the one or more values being computed based at least on:
obtaining output data indicating predictions made by the at least one MLM, the predictions corresponding to one or more objects represented in one or more samples applied to the at least one MLM, and being based at least on compositions of the attributes of the one or more objects;
evaluating the output data to determine one or more performance metric values corresponding to performance of the at least one MLM with respect to the predictions for the subset of the attributes.

17. The at least one processor of claim 16, wherein the one or more generative MLMs generate the additional samples as compositions of attributes from the subset of the attributes.

18. The at least one processor of claim 16, wherein the one or more performance metric values indicate inference accuracy of the at least one MLM for the subset of the attributes relative to the attributes overall.

19. The at least one processor of claim 16, wherein the one or more performance metric values correspond to inference accuracy of the at least one MLM for a temporal pattern represented by values of the at subset of the attributes that vary over a plurality of samples.

20. The at least one processor of claim 16, wherein the at least one processor is comprised in at least one of:

a control system for an autonomous or semi-autonomous machine;

a perception system for an autonomous or semi-autonomous machine;

a system for performing simulation operations;

a system for performing digital twin operations;

a system for performing deep learning operations;

a system implemented using an edge device;

a system implemented using a robot;

a system incorporating one or more virtual machines (VMs);

a system implemented at least partially in a data center;

a system including a collaborative creation platform for three-dimensional (3D) content; or a system implemented at least partially using cloud computing resources.

\* \* \* \* \*